(12) United States Patent
Hsu et al.

(10) Patent No.: US 12,281,862 B2
(45) Date of Patent: Apr. 22, 2025

(54) DUAL-MODE HEATING AND COOLING DEVICES AND RELATED SYSTEMS AND METHODS

(71) Applicant: Duke University, Durham, NC (US)

(72) Inventors: Pochun Hsu, Durham, NC (US); Xiuqiang Li, Durham, NC (US)

(73) Assignee: Duke University, Durham, NC (US)

( * ) Notice: Subject to any disclaimer, the term of this patent is extended or adjusted under 35 U.S.C. 154(b) by 312 days.

(21) Appl. No.: 17/780,657

(22) PCT Filed: Dec. 2, 2020

(86) PCT No.: PCT/US2020/062851
§ 371 (c)(1),
(2) Date: May 27, 2022

(87) PCT Pub. No.: WO2021/113332
PCT Pub. Date: Jun. 10, 2021

(65) Prior Publication Data
US 2023/0020511 A1  Jan. 19, 2023

Related U.S. Application Data

(60) Provisional application No. 62/942,257, filed on Dec. 2, 2019.

(51) Int. Cl.
| | |
|---|---|
| *F28F 13/18* | (2006.01) |
| *F25B 27/00* | (2006.01) |
| *F25B 29/00* | (2006.01) |

(52) U.S. Cl.
CPC ............ *F28F 13/18* (2013.01); *F25B 27/002* (2013.01); *F25B 29/00* (2013.01); *F24D 2200/14* (2013.01); *Y02B 10/20* (2013.01)

(58) Field of Classification Search
CPC .... F24D 2200/14; F25B 27/002; F25B 29/00; F28F 13/18; Y02B 10/20
See application file for complete search history.

(56) References Cited

U.S. PATENT DOCUMENTS 4,290,416 A * 9/1981 Maloney ................. F24S 60/10
165/47
4,365,620 A * 12/1982 Bliamptis ............... F24S 20/63
126/633

(Continued)

FOREIGN PATENT DOCUMENTS

CN     204370630 U *  6/2015
CN     104453039 B *  9/2016

(Continued)

OTHER PUBLICATIONS

Song, Jianing et al., "Durable radiative cooling against environmental aging", Nature Communications, Aug. 16, 2022 [online]. [retrieved on Oct. 1, 2024]. Retrieved from the Internet: <URL: https://www.nature.com/articles/s41467-022-32409-7>. (Year: 2022).*

(Continued)

*Primary Examiner* — Ljiljana V. Ciric
(74) *Attorney, Agent, or Firm* — Myers Bigel, P.A.

(57) ABSTRACT

A dual-mode heating and cooling system includes a dual-mode heating and cooling device including a cooling part and a heating part that are configured to be selectively exposed to sunlight in a cooling mode and a heating mode, respectively, with the cooling part configured to provide radiative cooling to a structure, and with the heating part configured to provide solar heating to the structure. The device may include a film with the cooling part and the heating part side-by-side on the film.

16 Claims, 17 Drawing Sheets

(56) References Cited

U.S. PATENT DOCUMENTS

| | | | | |
|---|---|---|---|---|
| 4,615,381 A | * | 10/1986 | Maloney | F24S 60/10 |
| | | | | 126/638 |
| 8,459,248 B2 | * | 6/2013 | Milder | F24S 10/50 |
| | | | | 52/173.3 |
| 10,088,251 B2 | * | 10/2018 | Raman | F28F 3/12 |
| 10,386,097 B2 | | 8/2019 | Yu et al. | |
| 10,941,990 B2 | * | 3/2021 | Raman | F28F 3/02 |
| 11,022,344 B2 | * | 6/2021 | Hieke | F28F 23/00 |
| 11,215,407 B2 | * | 1/2022 | Raman | F28F 13/18 |
| 11,815,287 B2 | * | 11/2023 | Teitelbaum | F24F 11/70 |
| 2010/0067339 A1 | | 3/2010 | Kaida et al. | |
| 2011/0139148 A1 | * | 6/2011 | Milder | F24S 25/70 |
| | | | | 126/643 |
| 2012/0067339 A1 | | 3/2012 | Hall et al. | |
| 2012/0318475 A1 | * | 12/2012 | Glover | F24F 5/0017 |
| | | | | 165/47 |
| 2015/0338175 A1 | * | 11/2015 | Raman | B60H 1/32 |
| | | | | 165/185 |
| 2017/0314878 A1 | * | 11/2017 | Raman | F28F 13/185 |
| 2018/0163976 A1 | | 6/2018 | Glover et al. | |
| 2019/0017758 A1 | * | 1/2019 | Raman | F28F 3/12 |
| 2021/0219463 A1 | * | 7/2021 | Raman | H05K 7/20309 |
| 2022/0107118 A1 | * | 4/2022 | Daniels, II | F24S 80/30 |
| 2022/0178628 A1 | * | 6/2022 | Raman | F28F 3/12 |
| 2023/0020511 A1 | * | 1/2023 | Hsu | F28F 13/18 |
| 2023/0140254 A1 | * | 5/2023 | Kim | H10N 10/10 |
| | | | | 136/201 |

FOREIGN PATENT DOCUMENTS

| | | | | |
|---|---|---|---|---|
| CN | 112160473 A | * | 1/2021 | |
| CN | 116094368 A | * | 5/2023 | |
| KR | 20230126509 A | * | 8/2023 | |
| RU | 217330 U1 | * | 3/2023 | |
| WO | WO-2018123348 A1 | * | 7/2018 | |

OTHER PUBLICATIONS

Li, Xiuqiang et al. Integration of daytime radiative cooling and solar heating for year-round energy savings in buildings, Nature Communications, Nov. 30, 2020 [online]. [retrieved on Oct. 1, 2024]. Retrieved from the Internet: <URL:https://www.nature.com/articles/s41467-020-19790-x>. (Year: 2020).*

International Search Report and Written Opinion for PCT/US2020/062851 mailed Feb. 25, 2021, 8 pages.

Ge, T.S., et al., "Solar heating and cooling: Present and Future Development", Renewable Energy 126 (2018) 1126-1140.

Hu, Mingke, et al., "Field test and preliminary analysis of a combined diurnal solar heating and nocturnal radiative cooling system", Applied Energy 179 (2016) 899-908.

Li, Tian, et al., "A radiative cooling structural material", Science 364, 760-763, May 24, 2019, 5 pages.

Urge-Vorsatz, Diana, et al., in Climate Change 2014: Mitigation. (Intergovernmental Panel on Climate Change, 2014), chap. 9: Buildings (14 pages).

* cited by examiner

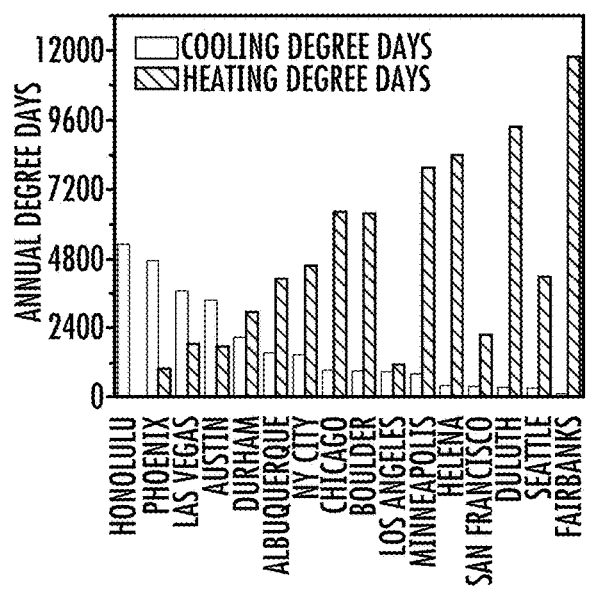
FIG. 2A
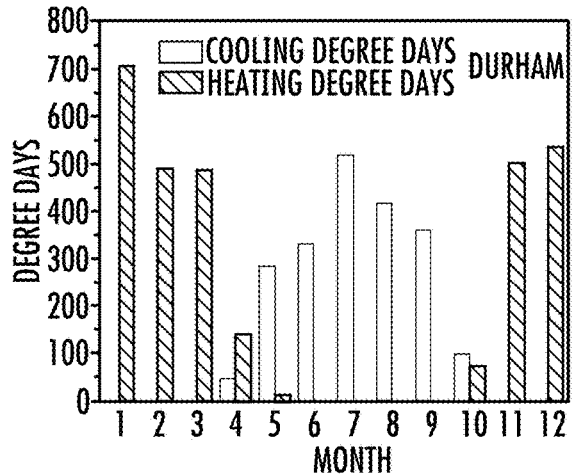
FIG. 2B
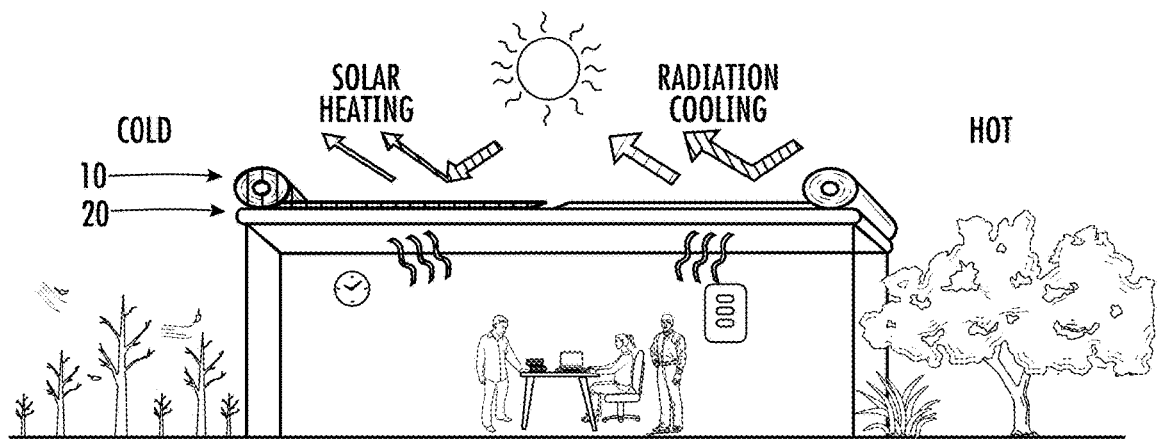
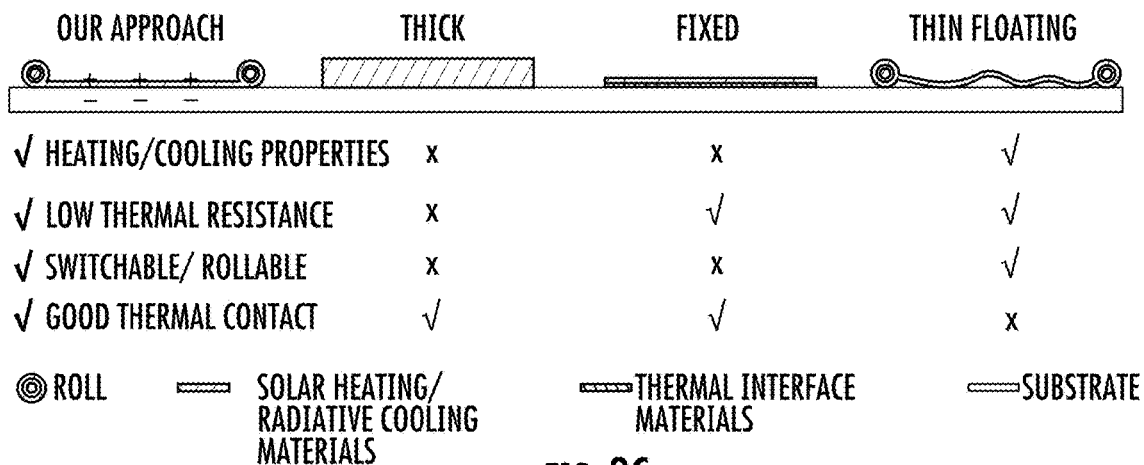
FIG. 2C

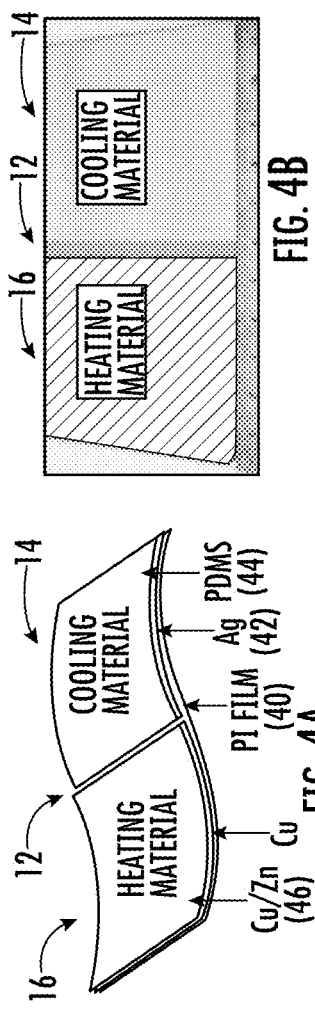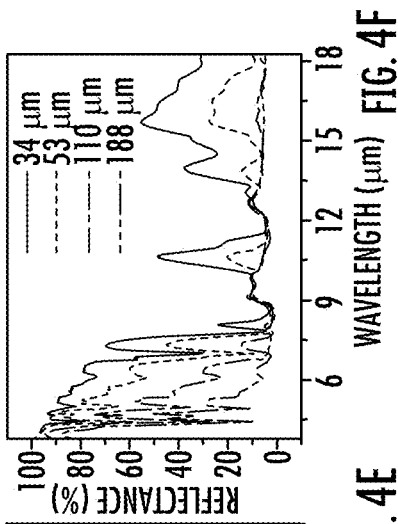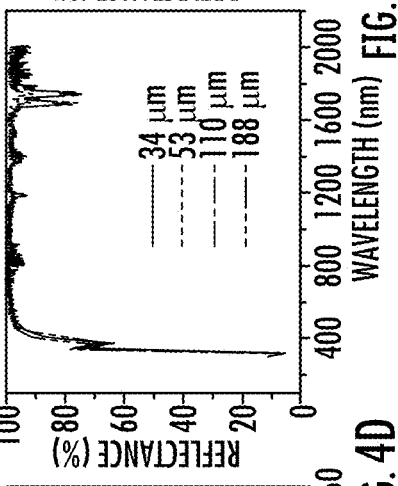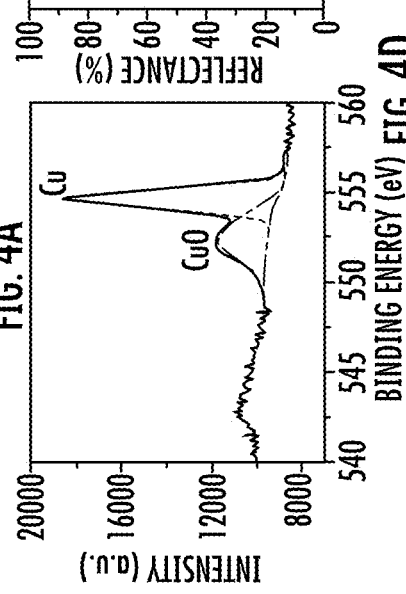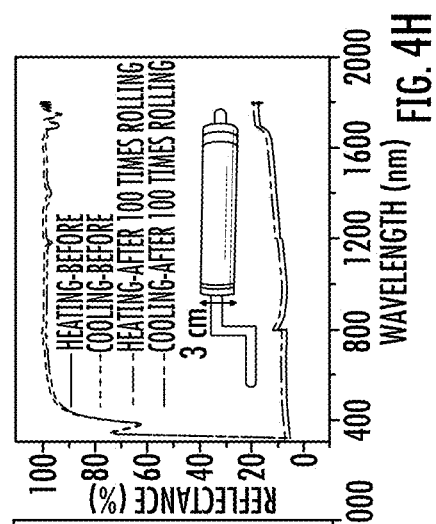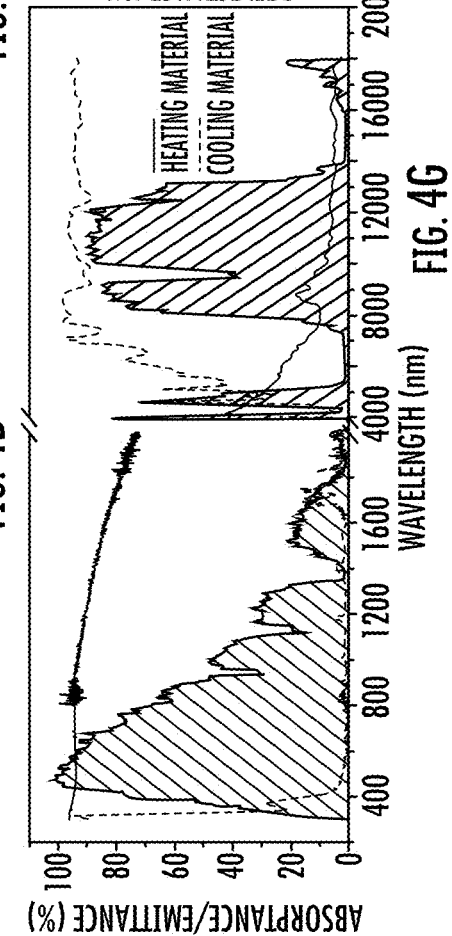

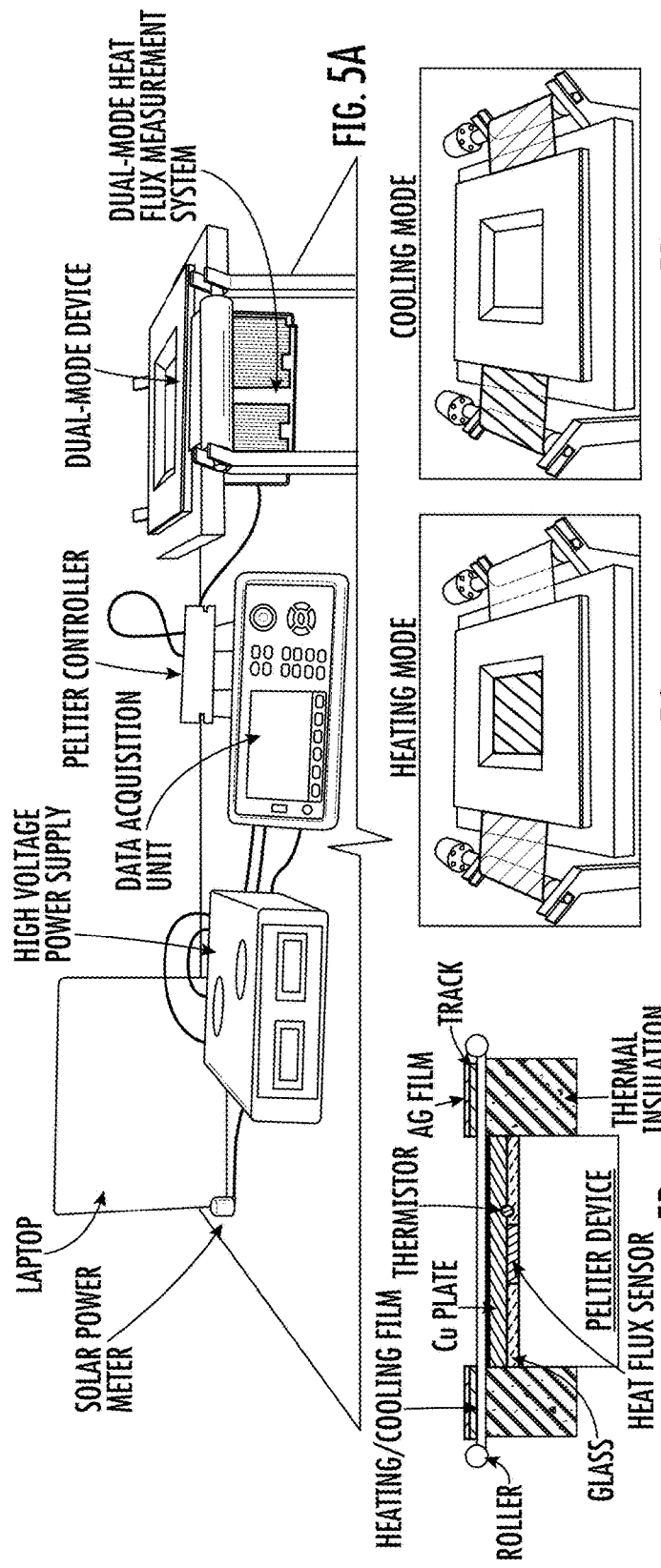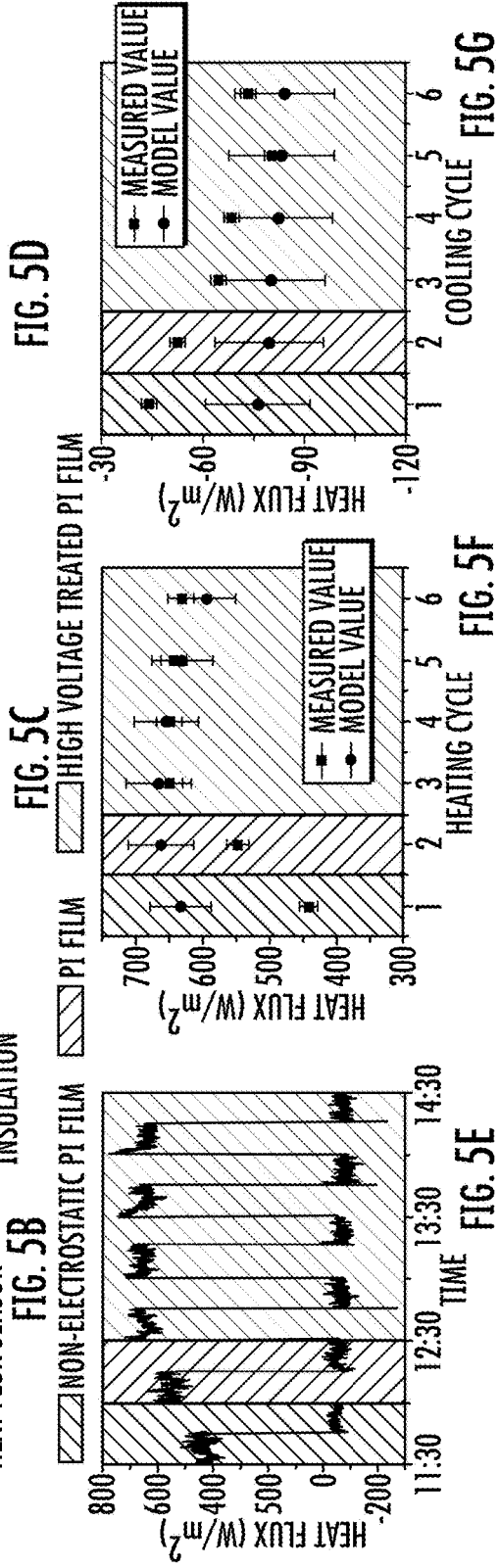

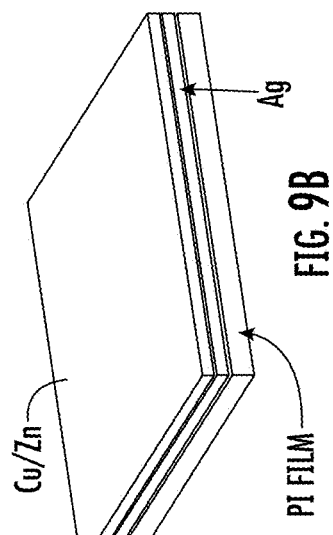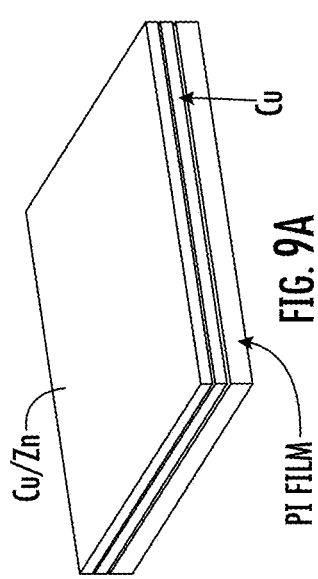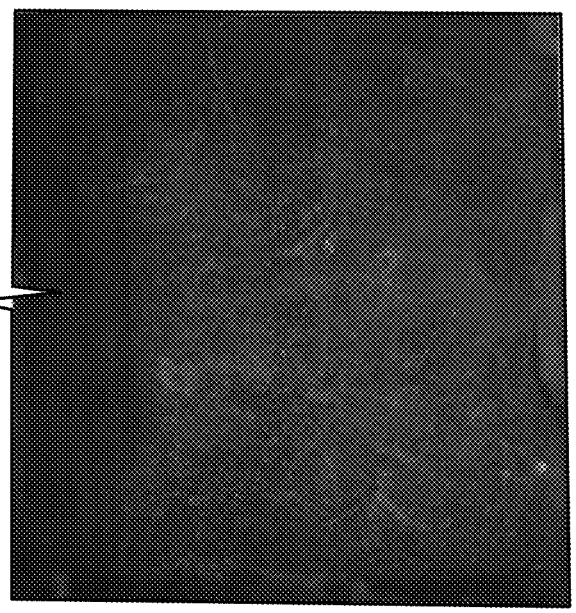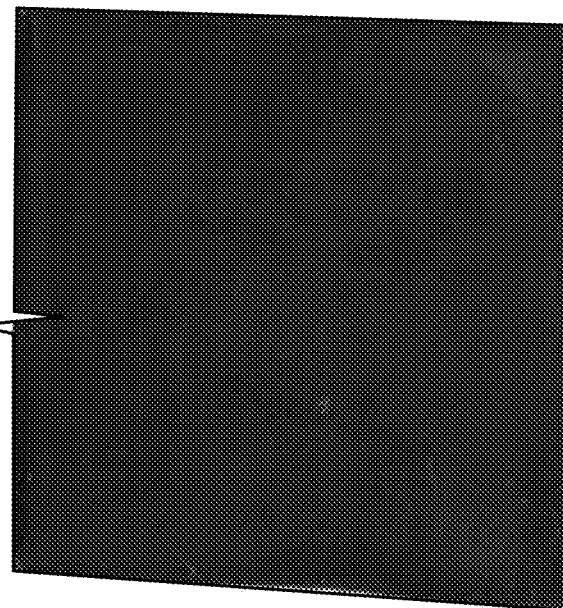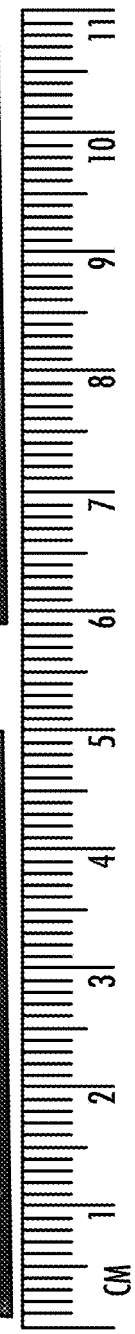
FIG. 9A
FIG. 9B
FIG. 9C

Cu L SERIES

Cu L SERIES

Cu L SERIES

COOLING MODE

DUAL-MODE HEATING AND COOLING DEVICES AND RELATED SYSTEMS AND METHODS

RELATED APPLICATIONS

This application is a 35 U.S.C. § 371 national stage application of PCT International Application No. PCT/US2020/062851, filed Dec. 2, 2020, which claims priority from U.S. Provisional Application Ser. No. 62/942,257, filed Dec. 2, 2019, the disclosures of which are hereby incorporated by reference in their entireties.

BACKGROUND

The heating and cooling energy consumption of buildings accounts for about 15% of national total energy consumption in the United States. In response to this challenge, many promising technologies with minimum carbon footprint have been proposed. However, most of the approaches are static and monofunctional, which can only reduce building energy consumption in certain conditions and climate zones. Having the capability to achieve both highly efficient cooling and heating in a limited roof area and to accomplish energy saving in various weather and climate conditions remains a challenge.

SUMMARY

Some embodiments of the present invention are directed to a dual-mode heating and cooling system including a dual-mode heating and cooling device including a cooling part and a heating part that are configured to be selectively exposed to sunlight in a cooling mode and a heating mode, respectively, with the cooling part configured to provide radiative cooling to a structure, and with the heating part configured to provide solar heating to the structure.

In some embodiments, the device includes a film with the cooling part and the heating part side-by-side on the film.

In some embodiments, the device includes first and second rollers with the film coupled thereto, and the first and second rollers are configured to be rotated in a first direction to expose the cooling part to the sunlight and in a second direction to expose the heating part to the sunlight. The heating part may be at least partially wound around the first roller when the cooling part is exposed to the sunlight, and the cooling part may be at least partially wound around the second roller when the heating part is exposed to the sunlight. The device may include a housing surrounding the film and the first and second rollers. The system may include a first cleaning mechanism adjacent the first roller and/or a second cleaning mechanism adjacent the second roller, with the first and second cleaning mechanisms configured to remove debris from the film.

In some embodiments, the film includes a substrate, the cooling part includes a solar-reflecting layer on the substrate and an infrared-emitting layer on the solar-reflecting layer, and the heating part includes a metallic layer comprising metal and/or metallic nanoparticles on the substrate. The substrate may include polyimide (PI), the solar-reflecting layer of the cooling part may include silver (Ag), the infrared-emitting layer may include polydimethylsiloxane (PDMS), and/or the metallic layer of the heating part may include copper (Cu) and zinc (Zn). The first layer of the cooling part may have substantial infrared absorption in the wavelength of 7-20 microns.

In some embodiments, the system includes a voltage source configured to supply a voltage to the film to reduce the thermal contact resistance between the film and the structure. The voltage source may be configured to supply a voltage of about 2 kV to the film.

In some embodiments, the system includes a temperature sensor and a controller. The controller may be configured to direct the system to expose the cooling part to the sunlight when the temperature is above a predetermined temperature and to expose the heating part to the sunlight when the temperature is below the predetermined temperature.

In some embodiments, the structure includes a roof, a wall, and/or a heat exchanger.

Some other embodiments of the present invention are directed to a method for dual-mode heating and cooling of a structure. The method includes: providing a dual-mode heating and cooling device or system as described herein; cooling a structure to which the device is coupled in the cooling mode; heating the structure in the heating mode; and automatically switching between the cooling and heating steps multiple times in response to a measured outside temperature.

In some embodiments, the device includes a flexible film on which the cooling part and the heating part are disposed. The device may include first and second rollers, and the method may include rotating the rollers in a first direction to expose the cooling part and rotating the rollers in a second, opposite direction to expose the heating part.

In some embodiments, the method includes applying voltage to the film to reduce the thermal contact resistance between the film and the structure. The method may include removing the voltage from the film while maintaining a static charge between the film and the structure.

BRIEF DESCRIPTION OF THE DRAWINGS

The accompanying Figures and Examples are provided by way of illustration and not by way of limitation. The foregoing aspects and other features of the disclosure are explained in the following description, taken in connection with the accompanying example figures (also "Fig.") relating to one or more embodiments.

FIG. 2A is a chart illustrating annual heating and cooling degree days of 16 U.S. cities that represent the 16 climate zones.

FIG. 2B is a chart illustrating heating and cooling degree days over 12 months in Durham, N.C., USA.

FIG. 2C is a schematic of a dual-mode device at heating (left) and cooling (right) mode. The switchable building envelope can utilize both renewable heating and cooling sources. Identified are four criteria of the dual-mode device: heating/cooling optical properties, thermal resistance, rollability, and thermal contact.

FIG. 4A illustrates the structure of dual-mode heating/cooling material according to some embodiments. Polyimide (PI) is the common substrate. Above the PI substrate, different configurations are used for the two modes. For cooling mode, Ag film is the electrode for exerting the electrostatic force (Maxwell pressure) and for reflecting the solar radiation. The top PDMS layer is visibly-transparent and infrared-emissive for radiative cooling. For heating mode, Cu is the electrode for supplying static charge, and the Cu/Zn is the plasmonic selective absorber. The thickness of PDMS, Cu/Zn, Ag, Cu, and PI film are 110 µm, 1 µm, 300 nm, 300 nm, and 25 µm, respectively.

FIG. 4B is a photograph of the dual-mode material that shows the different visible appearance of the heating/cooling parts.

FIG. 4C is a SEM image of the heating material.

FIG. 4D illustrates the XPS spectrum of copper particle on the heating material.

FIGS. 4E and 4F illustrate visible, near-IR, and mid-IR reflectance spectra of cooling materials of different thicknesses.

FIG. 4G illustrates absorptance/emittance of dual-mode material. Solar spectrum (shaded area), and atmospheric transmittance window (shaded area) are plotted for references.

FIG. 4H illustrates reflectance of heating and cooling material before/after 100 times rolling testing. The inset is the photo of the sample under testing.

FIG. 5A illustrates the testing system to demonstrate outdoor real-time performance of the dual-mode device.

FIG. 5B is a schematic of a portion of the testing system of FIG. 5A.

FIGS. 5C and 5D are photographs of the dual-mode heat flux measurement device with heating mode and cooling mode.

FIG. 5E illustrates the measured heat flux during the testing period. Positive values represent heating. For comparison, the first cycle was performed using non-electrostatic PI film, the second cycle used PI film without external voltage, and the rest of the cycles used PI film with external voltage supply. The efficacy of Maxwell pressure-induced thermal contact is clearly shown.

FIG. 5F illustrates the average solar heating heat flux over cycles.

FIG. 5G illustrates average radiative cooling heat flux over cycles. The error bars reflect the measurement accuracy.

FIG. 9A is a schematic of heating material including a copper layer according to some embodiments.

FIG. 9B is a schematic of heating material including a silver layer according to some embodiments.

FIG. 9C is an optical image of the heating materials of FIGS. 9A and 9B.

DETAILED DESCRIPTION

Figure 1A:
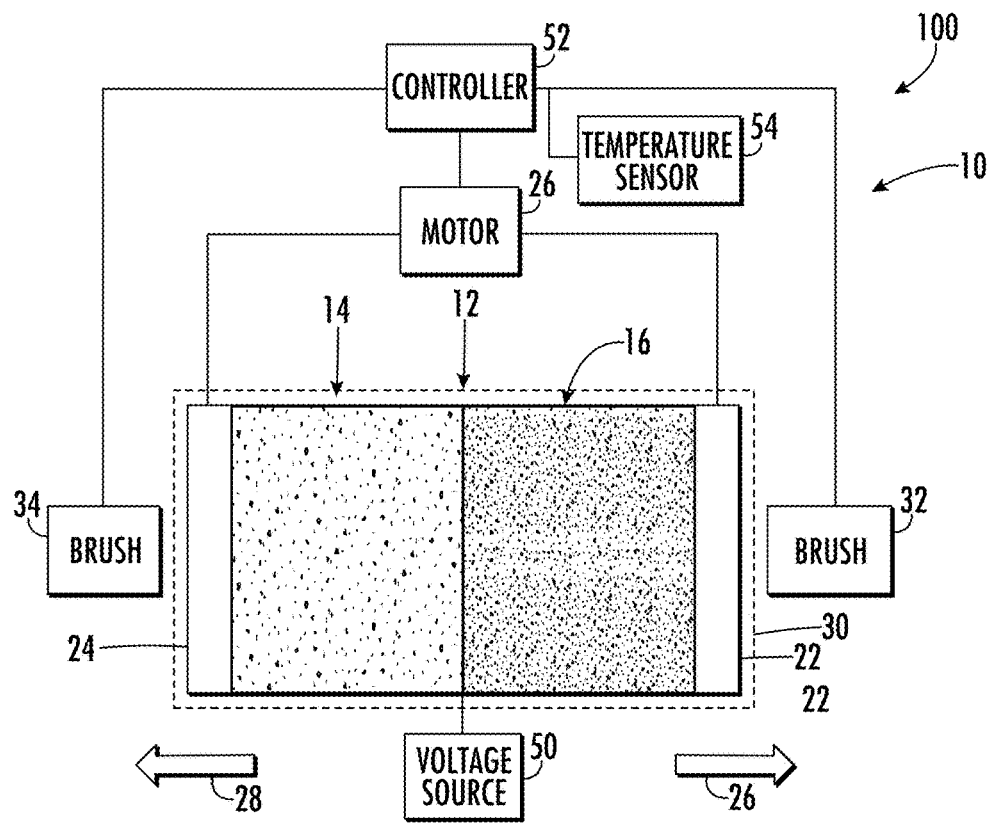
FIGS. 1A-1C schematically illustrate a dual-mode heating and cooling system according to some embodiments.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations where interpreted in the alternative ("or").

As used herein, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

Moreover, the present disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

The present disclosure provides a dual-mode device that can switch between radiation cooling and solar heating for building energy saving. The dual-mode device with electrostatically-controlled thermal contact conductance, which can achieve up to 71.6 W/m$^2$ of cooling power density and up to 643.4 W/m$^2$ of heating power density (over 93% of solar energy utilized) because of the suppression of thermal contact resistance and the engineering of surface morphology and optical property. Building energy simulation shows that the dual-mode device, if widely deployed in the United States, can save 19.2% heating and cooling energy, which is 1.7 times higher than cooling-only and 2.2 times higher than heating-only approaches.

The energy consumption in buildings accounts for over 30% of total global final use and is responsible for 20% of global greenhouse gas emissions, which causes serious problems to both environment and economy. Statistics show that the annual building energy cost is over $430 billion in the U.S. Among this huge energy consumption, approximately 48% is for space heating and cooling. Moreover, because of climate change and population growth, it is predicted that heating and cooling energy consumption for buildings will grow by 79% and 83%, respectively, over the period of 2010-2050. Therefore, achieving high energy efficiency in buildings with minimum carbon footprint has become an essential goal for sustainability and calls for innovation of science and technology. One grand challenge is that most buildings are located in a highly dynamic weather that can compromise the efficacy of passive solar heating or radiative cooling. These variations are both spatial and temporal, which include diurnal and seasonal fluctuation, climate zone dependence, energy price fluctuation, and so on.

For example, heating degree days and cooling degree days can commonly and quantitatively describe the heating and cooling demands of buildings. FIG. 2A shows the annual heating and cooling degree days of 16 U.S. cities that represent the 16 climate zones. It can be found most cities need both heating and cooling in the whole year. Taking Durham, North Carolina as an example, the cooling consumption predominates from May to October, and the remaining six months are heating-dominant (FIG. 2B). These statistics clearly manifest the need for smart and renewable indoor thermal environmental management that can switch between cooling and heating to cope with various situations and to achieve higher energy saving all year round.

To accomplish this goal, the present invention resorts to two infinite radiative heat source and cold source: The Sun (5800 K) and the outer space (3 K), respectively, to supply heating and cooling to buildings without using fossil fuels. For ideal daytime radiative cooling materials, the materials should have high reflectance in 200-2500 nm and high emissivity in 8-13 μm. For ideal solar heating, it is expected the material has high absorption in 200-2500 nm and low emissivity in >2500 nm. Prior research efforts for both solar heating and radiative cooling have yielded both high technological performance and deep scientific understanding, which spans from a variety of fields, including materials science, photonics and plasmonics, and heat transfer. However, they are mostly static or quasi-dynamic devices, which cannot completely solve the dynamic heating and cooling demand problem effectively, especially in the daytime. For the few prior reports of dynamic solar and mid-IR heat management, none of them demonstrate the ideal properties for both modes—selective absorber for solar heating and highly solar reflective layer for daytime radiative cool cooling (Table 1). In other words, the heating/cooling performance were sacrificed for the dynamic tunability.

TABLE 1

Summary and comparison of the synergistic technologies based on solar heating and radiative cooling reported in literature.

|  | Daytime sub-ambient cooling | Solar heating with selective absorber | Heating performance Absorption (A) Emissivity (E) Transmittance (T) | Cooling performance Reflectance (R) Emissivity (E) | Tuning method |
|---|---|---|---|---|---|
| Hu et al.[1] | x | x | 300-2000 nm A = ~90%; 8-13 μm E = ~80% | 300-2000 nm A = ~90%; 8-13 μm E = ~80% | — |

TABLE 1-continued

Summary and comparison of the synergistic technologies based on solar heating and radiative cooling reported in literature.

| | Daytime sub-ambient cooling | Solar heating with selective absorber | Heating performance Absorption (A) Emissivity (E) Transmittance (T) | Cooling performance Reflectance (R) Emissivity (E) | Tuning method |
|---|---|---|---|---|---|
| Vall et al.[2] | x | ✓ | Commercial Ti absorber | Black paint | (Hypothetical) Mechanical |
| Hu et al.[3] | x | x | — | — | Tandem approach |
| Ono et al.[4] | ✓ | x | 8-13 μm<br>E = 5.4% | 8-13 μm<br>E = 63.6% | Thermal |
| Mandal et al.[5] | x | x | 300-2000 nm<br>A = ~90%;<br>4-18 μm<br>E = ~90% | 300-2000 nm<br>R = ~88%;<br>8-13 μm<br>E = ~60% | Electrical |
| Mandal et al.[6] | ✓ | x | 300-2000 nm<br>T = ~94%;<br>4-18 μm<br>E > 90% (Water) | 300-2000 nm<br>R = ~95%;<br>8-13 μm | Mechanical |
| Zhao et al.[7] | ✓ | x | 300-2000 nm<br>A = ~95%;<br>4-18 μm<br>E = ~94%<br>(PDMS) | 300-2000 nm<br>R = ~93%;<br>8-13 μm<br>E = ~94% | Mechanical |
| Our work | ✓ | ✓ | 300-2000 nm<br>A = 93.4%;<br>4-18 μm<br>E = 14.2% | 300-2000 nm<br>R = 97.3%;<br>8-13 μm<br>E = 94.1% | Mechanical |

As disclosed herein, the dual-mode smart heat managing device that possess the ideal dual-mode optical properties and can achieve up to 71.6 W/m$^2$ of cooling power density and up to 643.4 W/m$^2$ of heating power density (over 93% of solar energy can be utilized) from experimental tests by optimizing the optical, mechanical, and heat transfer properties at various scales, ranging from nanoscale surface morphology to device-level design. Rigorous calculation of building energy efficiency that encompasses most of major cities in the U.S. were used to create the energy saving map for various climate zones. The map shows the dual-mode device outperforms the solar-heating-only and radiative-cooling-only devices, which can save 19.2% of building heating and cooling energy on average.

Description of Example Embodiments

Figure 1B:
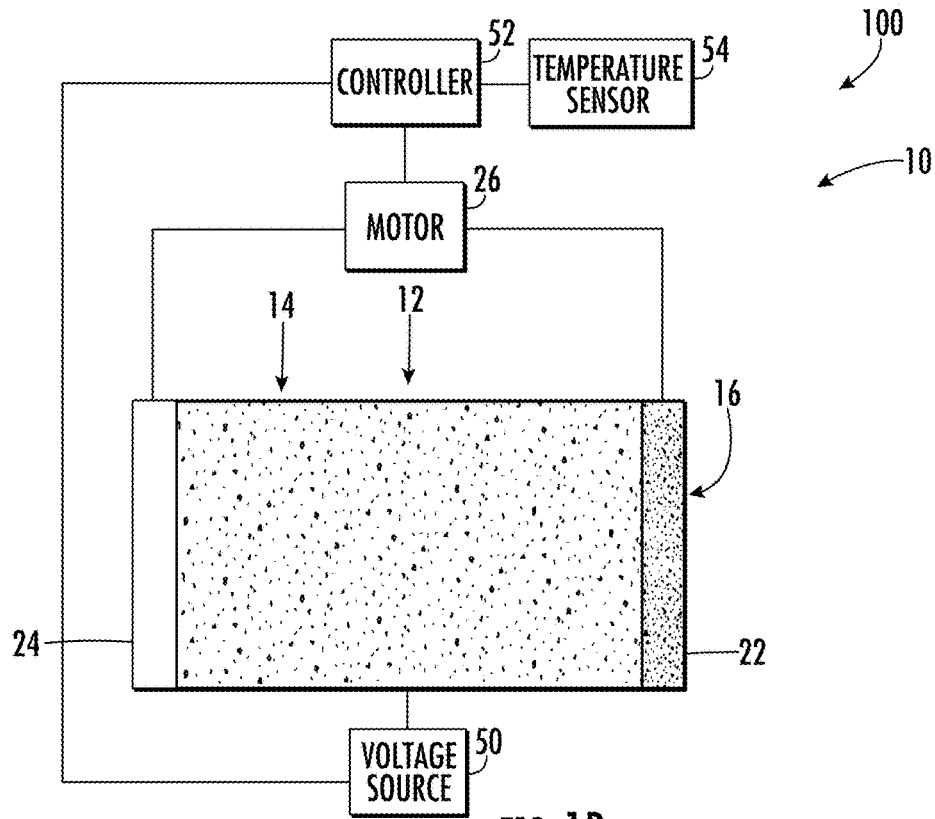
Figure 1C:
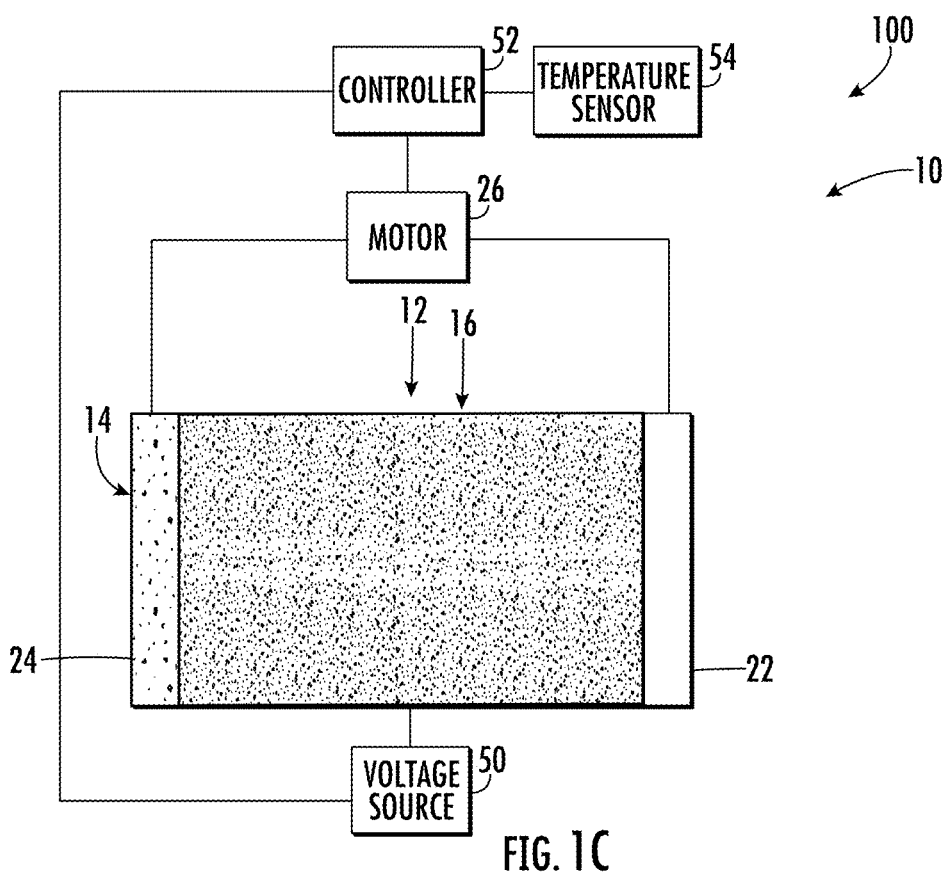

A dual-mode heating and cooling system 100 according to some embodiments is shown schematically in FIGS. 1A-1C. The system 100 includes a dual-mode heating and cooling device 10. The device 10 includes a flexible film 12 with a cooling part 14 and a heating part 16 disposed side-by-side on the film 12. The cooling part 14 and the heating part 16 are configured to be selectively exposed to sunlight in a cooling mode and a heating mode, respectively. The cooling part 14 is configured to provide radiative cooling to a structure 20 (FIG. 2C), and the heating part configured to provide solar heating to the structure 20. The structure 20 may be, without limitation, a roof, a wall, or a heat exchanger associated with an HVAC system.

In some embodiments, the film 12 including the cooling and heating parts 14, 16 has a thickness of 500 μm or less.

The film 12 may be coupled to first and second rollers 22, 24. The rollers 22, 24 may be rotated by a drive mechanism such as a motor 26. The rollers 22, 24 may be rotated in a first direction to translate the film 12 in a first direction 26 to expose the cooling part 14 to the sunlight (FIG. 1B) and to optionally block or hide the heating part 16 from the sunlight. The heating part 16 may be at least partially wound around the first roller 22 when the cooling part 14 is exposed to the sunlight (i.e., when the device 10 is in the cooling mode). The rollers 22, 24 may be rotated in a second, opposite direction to translate the film 12 in a second, opposite direction 28 to expose the heating part 16 to the sunlight (FIG. 1C) and to optionally block or hide the cooling part 14 from the sunlight. The cooling part 14 may be at least partially wound around the second roller 24 when the heating part 16 is exposed to the sunlight (i.e., when the device 10 is in the heating mode).

Other configurations to selectively switch between the cooling mode and the heating mode are contemplated. For example, there can be rotational mechanical switching using a slab (dual-mode), triangle prism (triple-mode), or square tube (quadruple-mode). Each face may be coated with a thin film material with different optical and infrared properties to perform heating, cooling, or other functions. Alternatively, there can be a shield or cover above the film that is configured to selectively translate to cover the heating part in the cooling mode and to cover the cooling part in the heating mode. These mechanical switching configurations can be controlled by a drive mechanism in a similar manner as described herein with regard to the rollers.

In some embodiments, the device 10, and more specifically the film 12 and the rollers 22, 24 may be enclosed by a housing 30 to help prevent debris on and/or under the film. There may be a first cleaning mechanism 32 such as a brush adjacent the first roller 22 and a second cleaning mechanism 34 such as a brush adjacent the second roller 24. Where used, the first and second cleaning mechanisms 32, 34 may be configured to clean or remove debris from the film 12.

Referring to FIG. 4A, the film 12 may include a substrate 40. The substrate 40 may be or include a polymer such as polyimide (PI). The cooling part 14 may include a first layer 42 on the substrate 40 and an infrared-emitting layer 44 on the first layer 42. The top layer 44 of the cooling part 14 may have substantial infrared absorption in the wavelength of 7-20 microns. In some embodiments, the top layer 44 has an infrared absorption or absorbance of at least 70% in the wavelength of 7-20 microns.

The first layer 42 of the cooling part 14 may be a metallic layer and may be or include silver (Ag). In some embodiments, the top layer 44 is a polymer layer with substantial infrared absorption in the wavelength of 7-20 microns. Such a polymer may contain chemical bonds of Si—O, C—O, C=O, O—H, S—O.

The solar-reflecting layer 42 may be made of metal or dielectric multilayers. In some embodiments, the infrared-emitting layer 44 may be or include polydimethylsiloxane (PDMS).

The heating part 16 includes a metallic layer 46 including metal and/or metallic nanoparticles. In some embodiments, the metallic layer 46 of the heating part 16 includes copper (Cu) and zinc (Zn).

In some embodiments, the cooling part 14 has a reflectance or reflectivity of at least 80% in the wavelength of 200-2500 nm. In some embodiments, the cooling part has an emissivity of at least 0.7 in the wavelength of 8-13 μm. In some embodiments, the heating part 16 has an absorption or absorbance of at least 80% in the wavelength of 200-2500 nm. In some embodiments, the heating part 16 has an emissivity of no greater than 0.3 in the wavelength of >2500 nm.

In some embodiments, the dual-mode smart heat managing device 20 can produce at least 50 W/m$^2$ of cooling power density and/or at least 500 W/m$^2$ of heating power density (at least 50% of solar energy can be utilized).

The system 100 may include a voltage source or voltage supply 50. The voltage source 50 may be configured to supply voltage to the film 12 to reduce the thermal contact resistance between the film 12 and the structure 20 (FIG. 2C). In some embodiments, the voltage supply 50 may supply a voltage of about 2 kV to the film 12. As described in more detail below, the voltage supply 50 may apply the voltage and then remove the voltage to "charge" the film 12 and a static charge between the film 12 and the structure 20 may be maintained for a period of time (e.g., several days).

The system 100 may include a controller 52 and a temperature sensor 54. The controller 52 may be configured to direct the system to expose the cooling part 14 to the sunlight when the outside temperature is above a predetermined or preset temperature and to expose the heating part 16 to the sunlight when the outside temperature is below the predetermined or preset temperature. In other words, the system may monitor the outside temperature and switch between the cooling and heating modes based on the monitored temperature.

Some embodiments of the invention are directed to a structure such as a home and a plurality of the dual-mode heating and cooling devices 10 on the structure (e.g., on the roof). Each device 10 may have a size similar to that of a solar panel.

Figure 1D:
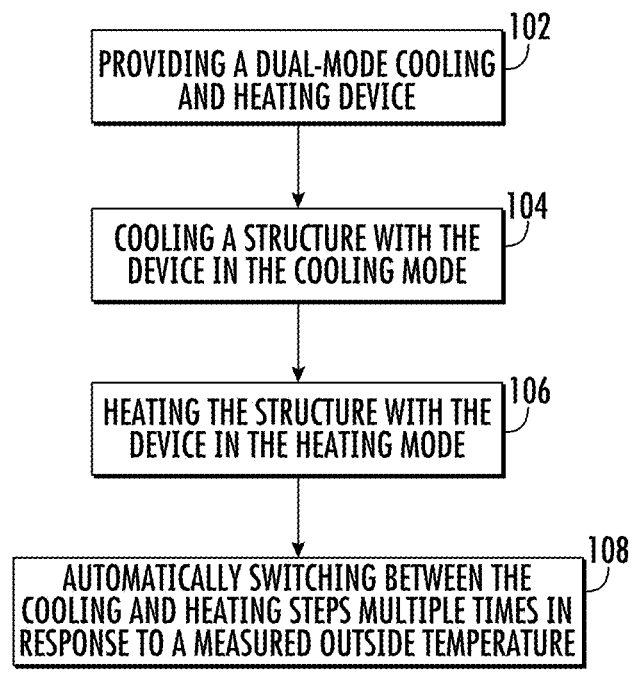
FIG. 1D is a flowchart illustrating example operations according to some embodiments.

FIG. 1D is a flowchart illustrating a method in accordance with some embodiments of the present invention. A dual-mode heating and cooling device as described herein is provided (Block 102). The method includes cooling a structure to which the device is coupled in the cooling mode (Block 104). The method includes heating the structure in the heating mode (Block 106). The method includes switching between the cooling and heating steps multiple times in response to a measured outside temperature (Block 108).

In some embodiments, the device includes a flexible film on which the cooling part and heating part are disposed. The device may include first and second rollers and the method may include rotating the rollers in a first direction to expose the cooling part and rotating the rollers in a second, opposite direction to expose the heating part. The method may include applying voltage to the film to reduce the thermal contact resistance between the film and the structure. The method may include removing the voltage from the film while maintaining a static charge between the film and the structure.

Results

Concept of Dual-Mode Device

FIG. 2C depicts an example embodiment of the dual-mode heat managing device or system. In this example embodiment the system consists of or includes a pair of rotary actuators or rollers and a thin-film polymer composite that has solar heating and radiative cooling functions side-by-side. In the cooling part of the material, sunlight is mostly reflected, and the thermal radiation to outer space through the atmospheric long-wave infrared transmission window (8-13 μm) is maximized, thereby achieving passive sub-ambient cooling that can contribute either directly to the wall/roof via heat conduction or to the heat exchanger that removes the heat from the chiller of air conditioning system. In the heating part, most of the solar energy is absorbed, and the radiation loss is strongly suppressed by the selective absorber, which results in high heat flux to the building envelope or the heat exchanger. When mode-switching is needed because of the change in weather or in energy balance, the actuators will pull the heating/cooling materials to move along the track system and expose the desired part of the materials to work in the ideal mode, and the rest of the material is rolled up and collected.

There are four key points to successfully realize the dual-mode design described herein: 1) The material should have excellent solar heating and radiative cooling properties to obtain high heating and cooling performance that is on par with most state-of-the-art solar heating and radiative cooling materials alone. 2) The material needs to have low thermal resistance to fully utilize the generated heating/cooling power or temperature difference. 3) The material needs to be flexible and lightweight for the rolling actuation process and durable to maintain the performance after cycles of switching. 4) The thermal contact resistance needs to be minimized between the soft and flexible material and the heated/cooled objects, i.e., roofs or heat exchanger. Although it is relatively straightforward to reduce the thermal contact resistance between stationary objects, it is not a trivial task for movable objects such as the heating/cooling material. A description of how to achieve these four design requirements are in the following paragraphs.

Electrostatically-Controlled Thermal Contact

Figure 3A:
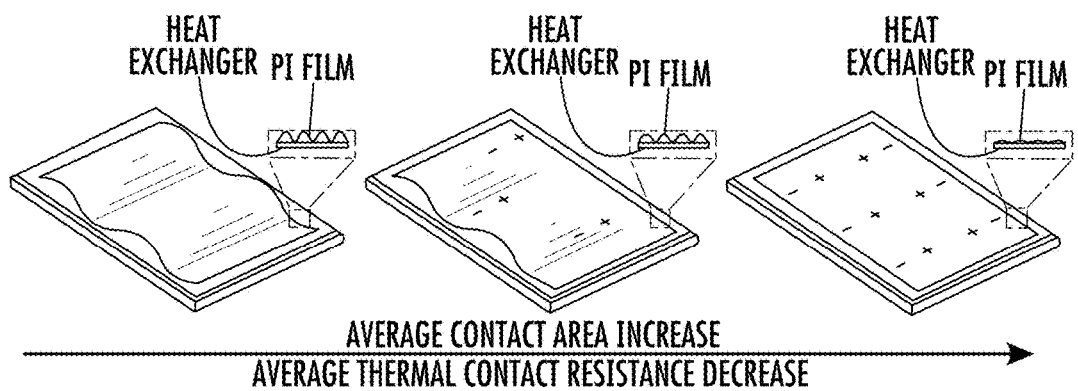
FIG. 3A is a schematic of dual-mode material morphology evolution as the function of surface static charges. As the static charge increases by either triboelectricity or applied voltage, the Maxwell pressure can increase both the macroscopic contact area and the local contact conductance, which significantly decreases the overall thermal contact resistance.
Figure 3B:
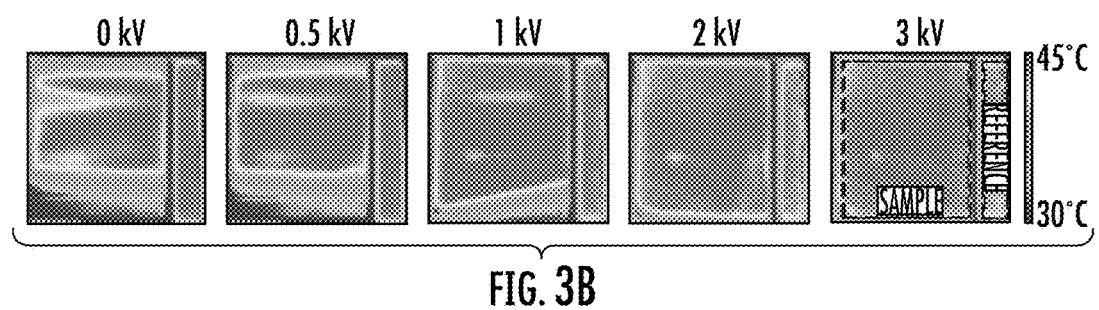
FIG. 3B includes thermography images of the cooling material on a constant temperature substrate after applying 0, 0.5, 1, 2, and 3 kV, respectively.
Figure 3C:
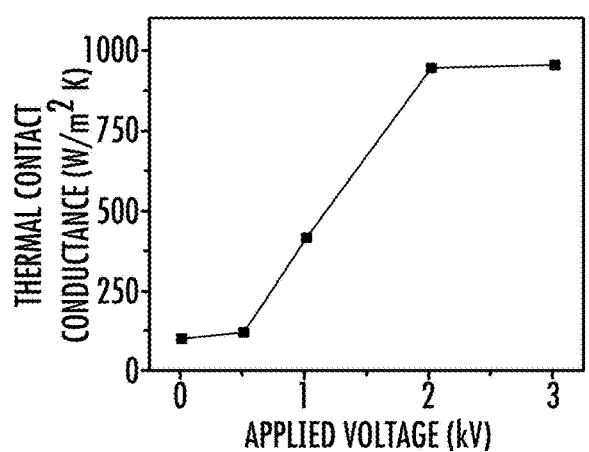
FIG. 3C is a graph illustrating thermal conductance over applied voltage.
Figure 3D:
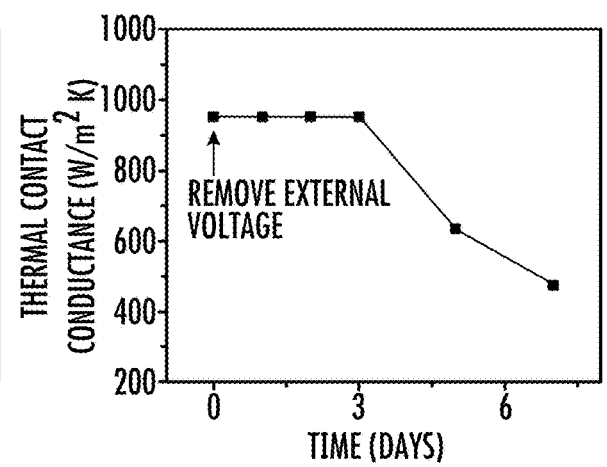
FIG. 3D is a graph illustrating that the average thermal conductance remains unchanged for 3 days even after the applied voltage is removed because of the strong tendency of the PI film to retain surface charges.
Figure 8:
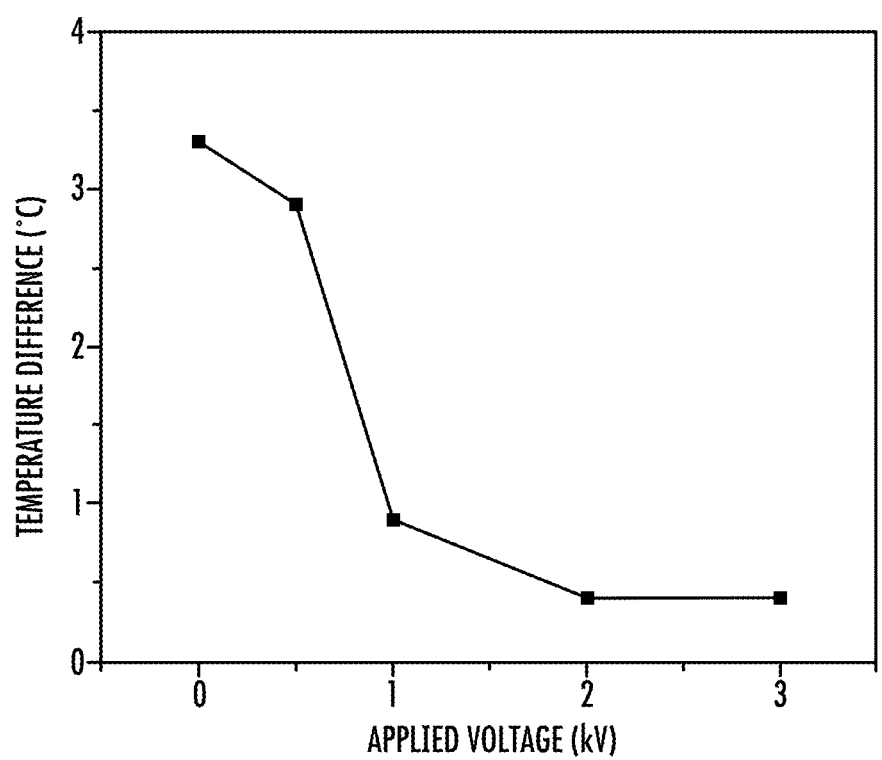
FIG. 8 is a chart illustrating average temperature difference between the reference and the sample over applied voltage.
Figure 10A:
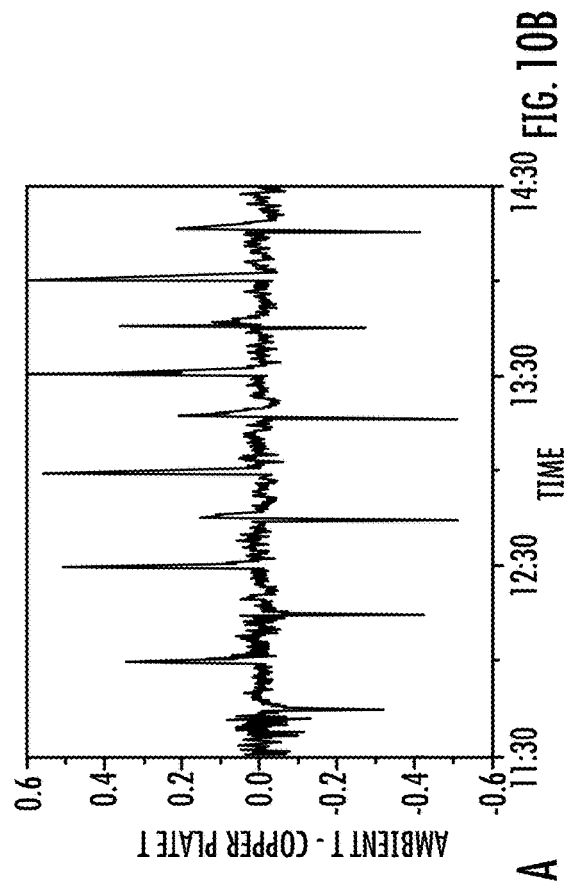
FIG. 10A is a chart illustrating ambient temperature and copper plate temperature over time for the outdoor experiment using the testing system of FIG. 5A.
Figure 10B:
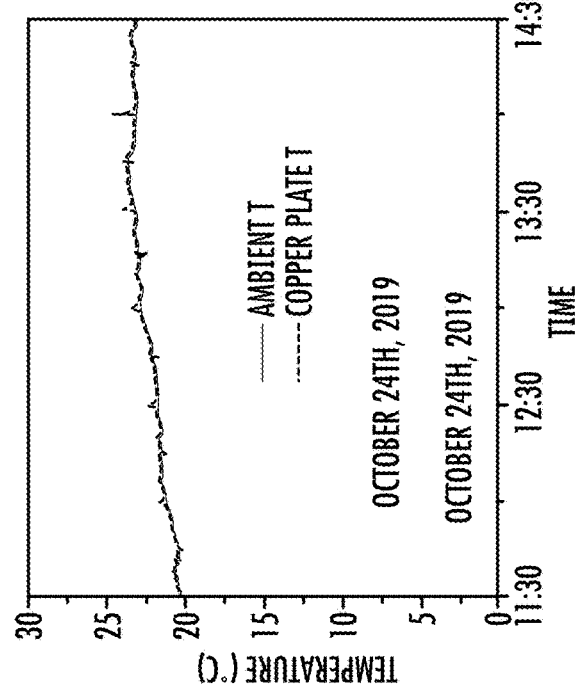
FIG. 10B is a chart illustrating the difference between ambient and copper plate temperature over time for the outdoor experiment using the testing system of FIG. 5A.
Figure 10C:
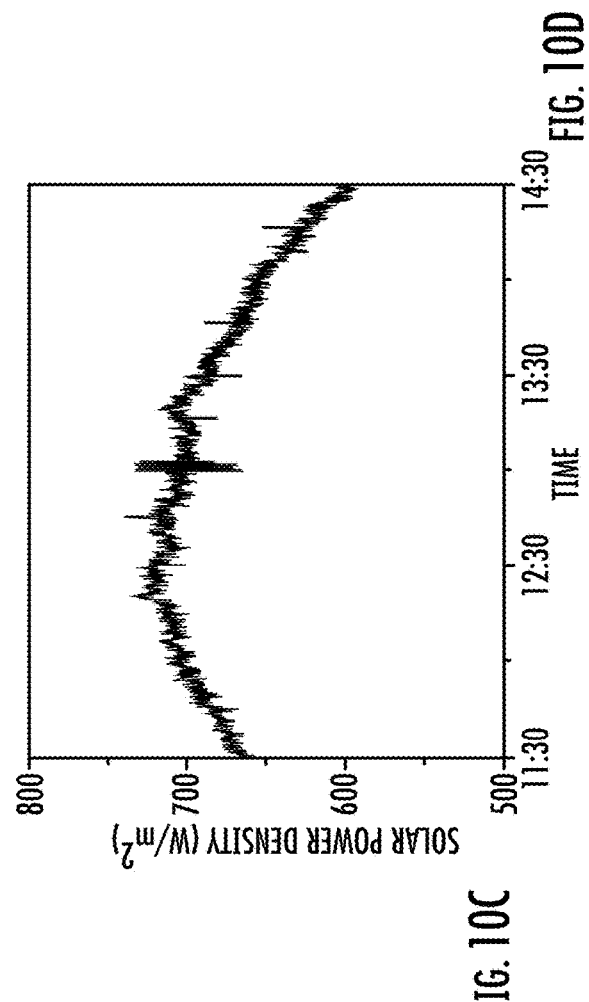
FIG. 10C is a chart illustrating humidity over time for the outdoor experiment using the testing system of FIG. 5A.
Figure 10D:
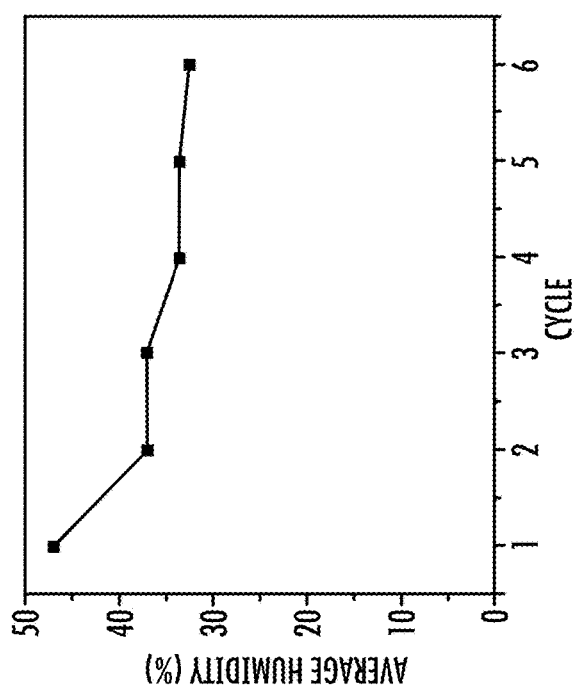
FIG. 10D is a chart illustrating solar power density during the testing period from 11:30 to 14:30 on Oct. 24, 2019 at Duke University, Durham, NC for the outdoor experiment using the testing system of FIG. 5A.

For dual-mode year-round building energy saving, as mentioned above, one important aspect is to reduce thermal contact resistance between dual-mode material and the underlying object, otherwise the heating/cooling energy would not be transported and fully utilized by the building. Although there are many effective methods to ensure a good thermal contact, such as welding and thermal interface materials (TIMs), these strategies are not applicable in the system described herein because the material needs to be frequently attached/removed for mode-switching. Note that it is also not ideal to increase the material weight and resort to larger gravitational force to reduce the contact resistance because that will increase the thermal resistance of the material itself and the required energy for actuation (FIG. 2C). As a result, if the dual-mode material thin film is simply let in contact with the object, the wrinkled texture leaves significant amounts of air gap in between, and the contact resistance is extremely large (FIG. 3A, left). Choosing polyimide (PI) film as the substrate can partially resolve the issue due to its capability to carry static charges (FIG. 3A, middle). To further boost the performance, high voltage is applied to the electrode and the Maxwell pressure is used to accomplish strong yet reversible thermal contact between the material and the object (buildings or heat exchanger) (FIG. 3A, right). To visually demonstrate this point, a radiative cooling material was placed on a constant temperature copper plate and an infrared camera was used to record the temperature change under different applied voltages (FIG. 3B). The corresponding optical images are in FIG. 7. Quantitatively, a carbon black reference was used on the plate to obtain the temperature difference between sample and substrate to calculate the contact resistance (more details can be found below in "Methods"). As shown in FIG. 3C, the average thermal contact conductance significantly increased as the applied voltage increased. The Maxwell pressure increases not only the macroscopic contact area (FIG. 7) but also the microscopic area, both of which result in the reduction of overall thermal contact resistance. The average thermal contact conductance can reach $9.5 \times 10^2$ W/m$^2$K at 2 kV applied voltage, and the corresponding temperature difference is suppressed to about 0.4° C. (FIG. 8). Note that even the voltage is high, the current is only about 0.07 mA, which is a safe current for the human body. Moreover, as shown in FIG. 3D, the average thermal contact resistance between PI film and substrate is almost unchanged after removing the voltage source for 3 days (Ambient condition: 20° C., 40% Humidity) due to the high electrical resistivity and hydrophobicity of PI. It can be expected that this static electricity may not last for several months, but in practical applications, the thermal contact can be rebuilt by periodic "charging", which is completed within a few seconds each time. This ability to maintain the static charge effect reduces the need to constantly supply high voltage and therefore enhances the device operation efficiency and lifetime (Analysis of the impact of dirt and humidity can be found in Supplementary Note 1). When switching is needed, a small reverse bias can be applied to offset the static charges and release the dual-mode material.

Optical Properties of Heating and Cooling Materials

For dual-mode year-round building energy saving, good thermal contact are necessary but not sufficient conditions. The other important aspect is to design a rollable film with low thermal resistance and high heating/radiative cooling performance. FIG. 4A illustrates the structure of the dual-mode heating/cooling material. Besides the strong tendency to retain surface static charges, PI film was selected as the substrate also because of its excellent flexibility (for mode-switching and rolling), smooth surface (for a smooth metallic back reflector in cooling mode and for lowering the thermal contact resistance), good mechanical property (for reducing the thickness and the thermal resistance of substrate itself). FIG. 4B shows the drastically different visual appearance of the two parts of the material: the heating part is black for sunlight absorption, and the cooling part is mirror-like for sunlight reflection. In the heating part, zinc film with copper particle was deposited as heating material due to its excellent selective absorption property. The morphology and composition of heating material was characterized by scanning electron microscopy (SEM) and X-ray photoelectron spectroscopy (XPS), as shown in FIGS. 4C and 4D. It can be found that clusters of approximately 1 μm in size composed of copper and copper oxide nanoparticles were uniformly deposited on Zn film (the optimized experiment can be found in Supplementary Note 2). Here, copper is used as the electrode for zinc electrodeposition to produce a uniform film (FIG. 9), and it also serves as the electrode to apply electrostatic charges.

On top of PI film, a silver film of 300 nm thick is deposited, followed by polydimethylsiloxane (PDMS). This part of the material is designed for cooling because silver can reflect the majority of solar radiation and PDMS has excellent transparency in visible regime and high thermal emissivity in mid-infrared regime. As shown in FIGS. 4E and 4F, it can be found that, with the increase of thickness of PDMS, the transmission of visible regime is almost unchanged, and the absorption of mid-infrared increases until 110 μm. Hence, 110-μm-thick PDMS was selected for further testing. After parameter optimization (FIGS. 4E and 4F), as shown in FIG. 4G, the cooling part has 97.3% reflectance in the wavelength range of 300-2000 nm and 94.1% emissivity in 8-13 μm. For the heating part, 93.4% absorption from 300-2000 nm and 14.2% emissivity were achieved. Moreover, the sample shows high mechanical flexibility and robustness. As shown in FIG. 4H, the performance of the sample is almost unchanged after 100 times rolling test. These standalone heating/cooling properties lay the foundation for the high-performance dual-mode heat management building envelope device according to embodiments described herein.

Outdoor Performances of Dual-Mode Device

To measure both the solar heating and radiative cooling heat flux of the dual-mode material, the Peltier-based performance measurement system was set up. The dual-mode testing system consists of mainly four parts: Peltier temperature control feedback system, data acquisition system, high voltage power supply, and ambient condition measurement system (FIG. 5A). As shown in FIG. 5B, the temperature control system uses the Peltier device to supply heating/cooling power to the copper plate, and a PID control program is employed to minimize the temperature difference between the copper plate and the ambient temperature, both of which are measured by thermistors connected to the data acquisition system and laptop. This method is designed to minimize the convective heat loss to/from the ambience. At steady state, the thermoelectrically-supplied heat flux equals the solar heating (downward heat flux) or the radiative cooling (upward heat flux), which is measured by the heat flux sensor between the Peltier device and the copper plate. As shown in FIGS. 5C and 5D, the switch process between heating and cooling can be achieved by a drive mechanism such as one or more motors or manually (see FIG. 5A). The outdoor experiment was performed on the campus of Duke University at Durham, North Carolina, on Oct. 24, 2019. The solar power intensity, humidity, and ambient temperature are measured real-time to calculate the model values to predict the heating/cooling heat fluxes (FIG. 10). The numerical model is an essential tool to calibrate the performance with respect to the local weather condition.

The heating and cooling performance of the dual-mode device is tested for six heating and cooling cycles (15 min per cycle), as shown in FIG. 5E. The positive heat flux represents heating, and the negative flux represents cooling. To demonstrate the importance of thermal contact conductance in the practical heating/cooling conditions, three samples were fabricated for testing: the gold-coated PI film without electrostatic charges (shown in red area), normal PI with zero voltage (yellow area), and normal PI film with 2 kV high voltage treatment (green area). As the electrostatic force increases, both heating and cooling heat fluxes increase, manifesting the impact of thermal contact conductance on the performance. The switching happens almost instantaneously, and the system can return back to thermal equilibrium within less than 100 seconds. Because of the small thickness and low heat capacity of the dual-mode material, there is very little thermal inertia to overcome, and the transient heat conduction can quickly propagate to the object (in this case, the heat flux sensor). In heating cycles, as shown in FIG. 5F, the average heat flux of non-electrostatic PI and zero-external-voltage PI only achieve 442±13.3 W/m$^2$ and 548±16.4 W/m$^2$, which is 70% and 83% of the model values (633±45.2 and 662.2±48 W/m$^2$, respectively). After applying high voltage, the device generates an average heating power of 643.4 W/m$^2$, which means over 93% of solar energy is utilized. Similarly, in cooling cycles, as shown in FIG. 5G, the average cooling heat fluxes of non-electrostatic PI and zero-external-voltage PI are 44.1±1.3 W/m$^2$ and 52.5±1.6 W/m$^2$, which are 58% and 66% of the model values (76.1±15.5 and 79.5±16.1 W/m$^2$, respectively). After applying high voltage, the measurement (average cooling power is about 71.6 W/m$^2$) and model match well. More details about model calculation can be found in Supplementary Note 3. This experiment clearly demonstrates the effectiveness of using electrostatic force to build the thermal contact between the dual-mode material and the object and how it can boost the performance approaching the theoretical prediction.

Building Energy Simulation

Figures 6A, 6B, 6C:
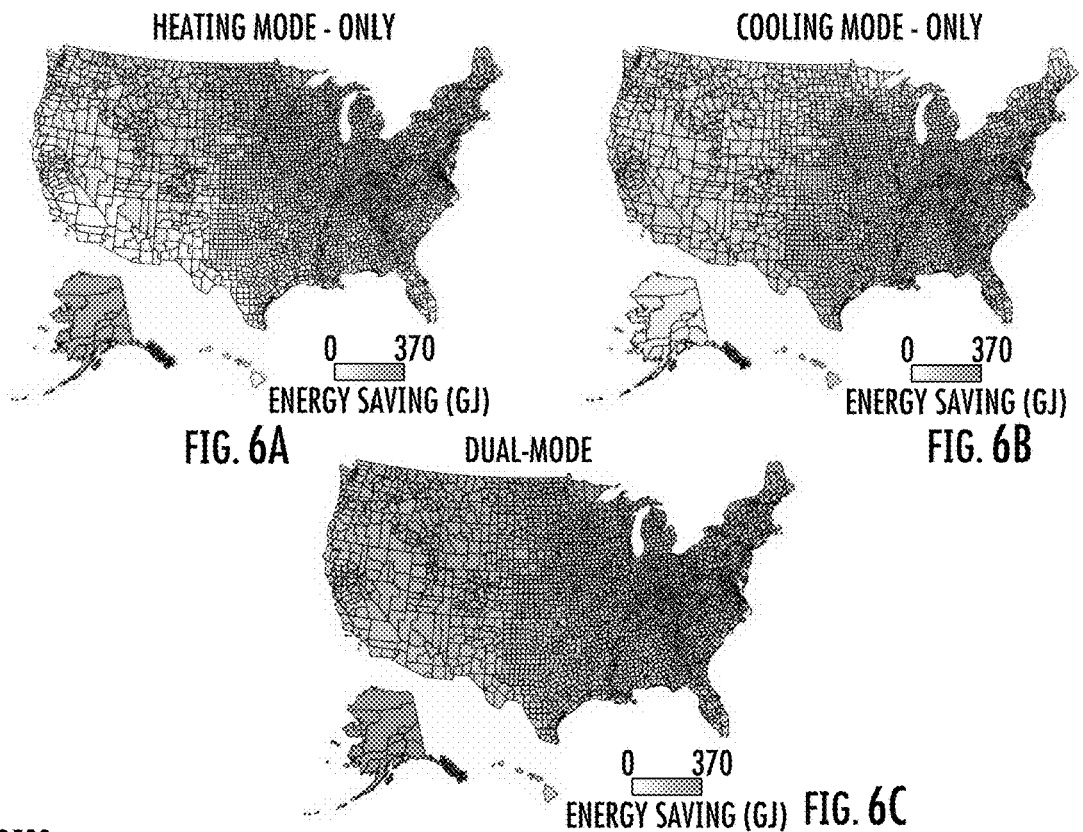
FIG. 6A is a building energy saving map for all U.S. climate zones with only heating mode.
FIG. 6B is a building energy saving map for all U.S. climate zones with only cooling mode.
FIG. 6C is a building energy saving map for all U.S. climate zones with dual-mode.
Figure 6D:
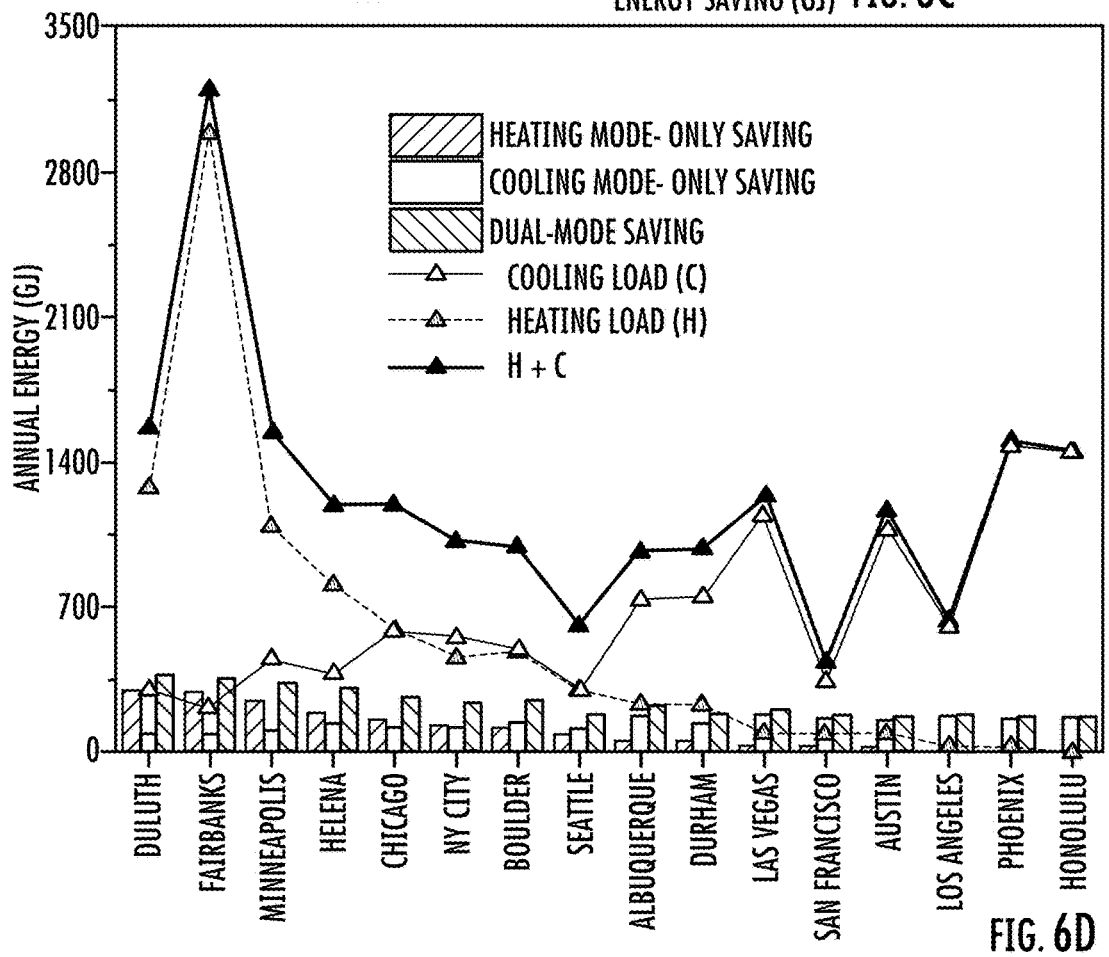
FIG. 6D is a chart illustrating annual averaged energy saving at different modes and energy loads over different cities.
Figure 7A:
FIGS. 7A-7E are optical images corresponding to the thermography images of FIG. 3B of the cooling material on a constant temperature substrate after applying 0, 0.5, 1, 2, and 3 kV, respectively.
Figure 7B:
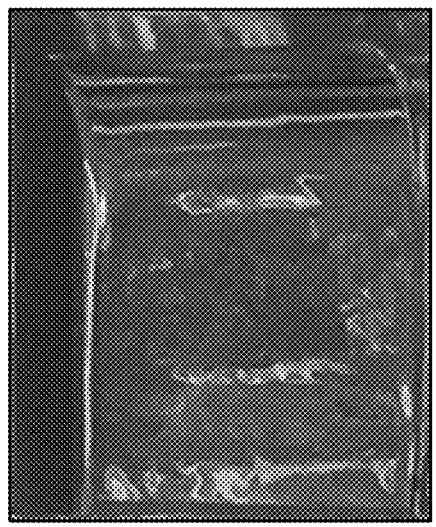
Figure 7C:
Figure 7D:
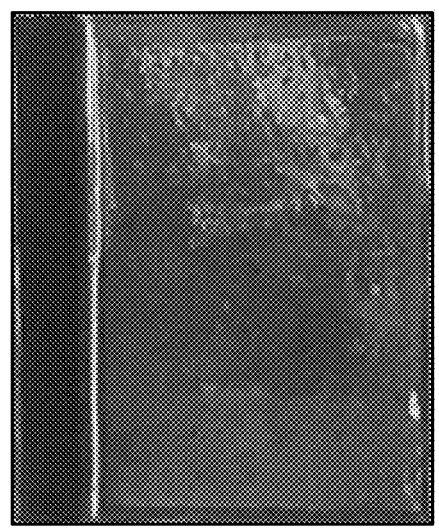
Figure 7E:
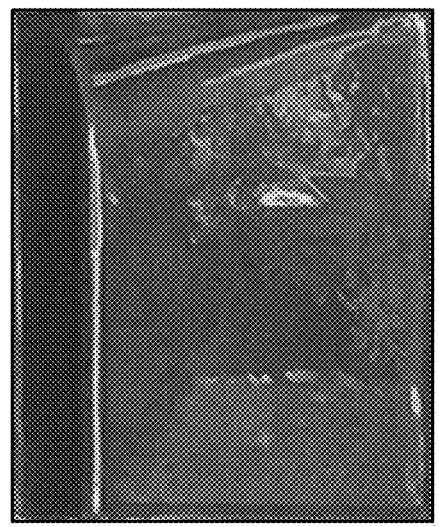

To quantitively predict the potential impact of the dual-mode device as described herein on building energy efficiency, EnergyPlus was used together with empirical material property data to calculate the year-round energy saving for heating-only, cooling-only, and dual-mode building envelopes. 16 cities were selected to represent the 16 climate zones in the U.S.—Albuquerque, Austin, Boulder, Chicago, Duluth, Durham, Fairbanks, Helena, Honolulu, Las Vegas, Los Angeles, Minneapolis, New York City, Phoenix, San Francisco, and Seattle. The corresponding energy saving maps of heating-only and cooling-only are shown in FIGS. 6A and 6B, respectively (more details about calculation can be found in Supplementary Note 3). These U.S. building energies saving maps convey several aspects of information. Firstly, solar heating is more beneficial in the north, and radiative cooling benefits more in the south. This is understandable based on the latitude dependence of climate. Secondly, radiative cooling saving is slightly larger than solar heating saving. This can be attributed to: 1) When the sunlight is relatively abundant, the required heating load is small (Noting that only real-time usage was considered, and did not consider any energy storage technology. It is expected that if some storage technologies can be combined, the energy savings will be significantly improved.). 2) The radiative cooling technology can provide cooling power throughout the entire 24 hours when space cooling is needed. The energy saving map of the dual-mode building envelope is then calculated and plotted in FIG. 6C. It can be seen that the dual-mode device has significant advantages in almost all climate zones in the U.S. compared with single-mode devices. To further manifest the overall impact to the U.S. building energy efficiency, the annual averaged energy consumption saving was calculated in GJ (FIG. 6D, the more details about calculation process can be found in Supplementary Note 3). The baseline of annual energy consumption for building heating and cooling are 548 GJ and 681 GJ, respectively. The calculation indicates that the dual-mode device can save 236 GJ (19.2% of the heating and cooling energy), which is 1.7 times higher than cooling-only (138 GJ) and 2.2 times higher than heating-only (106 GJ) devices.

Discussion

In this work, the heating/cooling performance of the smart dual-mode building envelopes was experimentally and computationally demonstrated, which is the outcome of rational design of optical, mechanical, and heat transfer properties. Such dynamic tunability will gain more and more significance as the renewable yet intermittent energy resources, such as solar and wind power, are being incorporated into the electric grid. On the other hand, climate change can also aggravate the spatial and temporal climate fluctuation in both frequency and magnitude, which calls for more adaptive building energy efficiency solutions. Together with the heating/cooling dual-modes device described herein, it is envisioned that devices with more energy modes, source-tracking functions, system-level optimization algorithm, or smart grid integration, will form the new design paradigm of zero-energy buildings.

Methods

Fabrication of Heating Material and Cooling

Polyimide (PI) film (Width (W): 13 cm, Length (L): 29 cm, Thickness (T): 25 μm) was selected as the substrate. Silver film (W: 12.5 cm, L: 14 cm, T: 300 nm) and copper film (W: 12.5 cm, L: 14 cm, T: 300 nm) were deposited onto the PI film side-by-side using the evaporator (Kurt Lesker PVD 75). The silver film was coated with a layer of polydimethylsiloxane (PDMS) of about 110 μm thick as the cooling material. On the copper film, a layer of zinc film of 1 μm thick was electrodeposited (voltage: 2 V, anode: zinc metal, electrolyte: 0.25 M $ZnSO_{4(aq)}$), followed by galvanic replacement reaction with 0.12 mM $CuSO_{4(aq)}$, and the heating material was obtained after deionized water washing and drying.

Characterizations

The morphology of the heating material was characterized by scanning electron microscopy (SEM, FEI Apreo) with the beam voltage/current of 5 kV/25 pA. The chemical composition of the heating material was characterized using X-ray photoelectron spectroscopy (XPS, Kratos Analytical Axis Ultra), equipped with a monochromatic Al Kα X-ray source. The reflectance of cooling material and heating material was measured by the UV-Visible-NIR spectrometer with a calibrated $BaSO_4$ integrating sphere (300-2000 nm, Agilent technologies, Cary 6000i) and the Fourier Transform Infrared (FTIR) spectrometer with a diffuse gold integrating sphere (4-18 μm, Thermo Scientific, iS50). The thermal images in our experiment were captured by the FLIR E60 infrared camera.

Commercial Building Heating and Cooling Model

EnergyPlus version 9.2 was utilized to predict the energy consumption and saving with different boundaries. 16 cities were selected to represent the 16 climate zones in the U.S.: Albuquerque, Austin, Boulder, Chicago, Duluth, Durham, Fairbanks, Helena, Honolulu, Las Vegas, Los Angeles, Minneapolis, New York City, Phoenix, San Francisco, and Seattle. The post-1980 medium office model defined by the U.S. Department of Energy was adopted for the calculation. The model building has three stories, and the roof area is 1660 m$^2$. For temperature boundary conditions, monthly internal temperature has been set by the medium commercial building model. Hourly weather data in the typical meteorological year was used as the external environment boundary condition. Baseline energy consumption for heating and cooling was established by running this model across U.S. Cooling load power per month ($P_{load}$) can also be calculated in this process.

Thermal Contact Conductance Measurement

Figure 11:
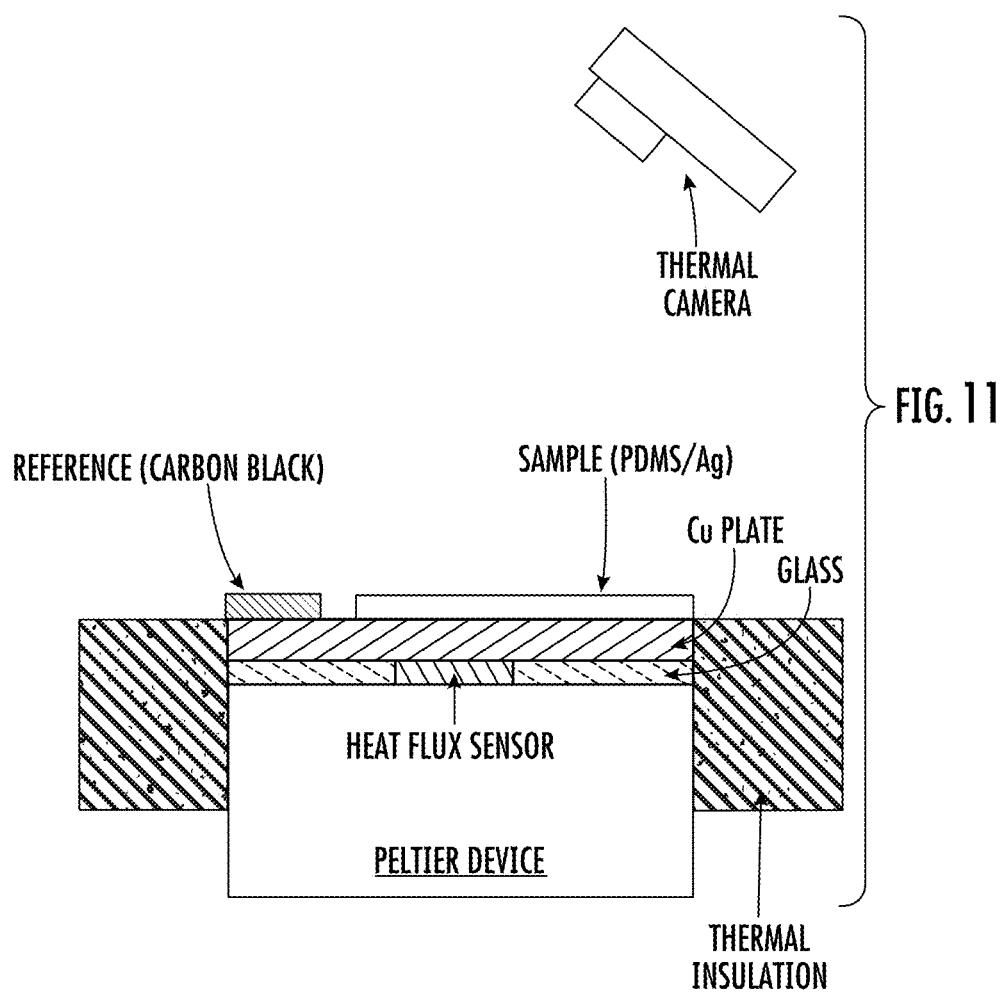
FIG. 11 is a schematic of a testing system of thermal contact conductance.

FIG. 11 shows the equipment to quantitatively characterize the thermal contact conductance. From the top surface, it involves reference (carbon glue of 80 µm thick)/sample, copper plate (Width: 5 cm, Length: 5 cm, Thickness: 1.5 mm), heat flux sensor of 1 mm thick (Electro Optical Components, Inc., A-04457) surrounded by glass with the same thickness, PID-controlled Peltier device (TE Technology Inc., TC-36-25). Thermal grease (Dow Corning, 340) was applied to ensure good thermal contact among Cu plate, glass slides, heat flux sensor, and Peltier device. The sidewall of the equipment is wrapped with polyurethane foam of about 5 cm thick to avoid heat loss. Calibrated thermal camera (FLIR E60) was used to record the steady-state temperature of reference and sample and therefore obtain temperature difference, $\Delta T$. Meanwhile, the heat flux sensor was used to measure the heat flux (q) in $W/m^2$. Assuming the temperature of reference is the same as the copper plate and neglect the thermal resistance of the sample itself, the thermal contact conductance ($h_c$) can be calculated based on $h_c = q/\Delta T$.

Measurement of Radiative Cooling and Solar Heating Power

The apparatus of measuring solar heating and radiative cooling heat flux is similar to the one used to measure thermal contact conductance but with a few operational differences. The temperature of copper plate is kept the same as the ambient temperature by using the PID program, so the convective heat loss to/from the ambience can be minimized. Both temperatures are measured by the thermistors (TE Technology Inc., TC-36-25). At steady-state, the supplied heating or cool power compensates for the radiative cooling or solar heating, and the heat flux sensor measures the corresponding cooling (upward heat flux) or heating (downward heat flux) power in $W/m^2$.

Figure 12A:
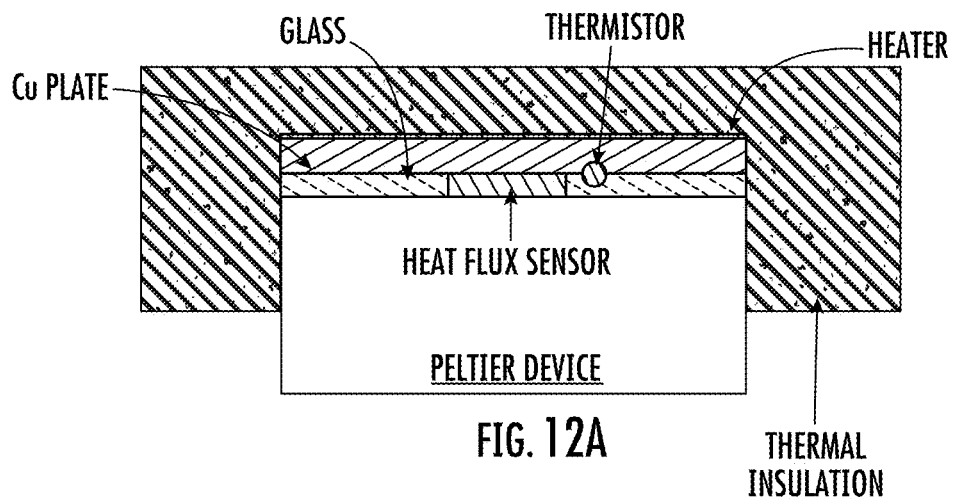
FIG. 12A is a schematic illustrating calibration of the testing system of FIG. 11.
Figure 12B:
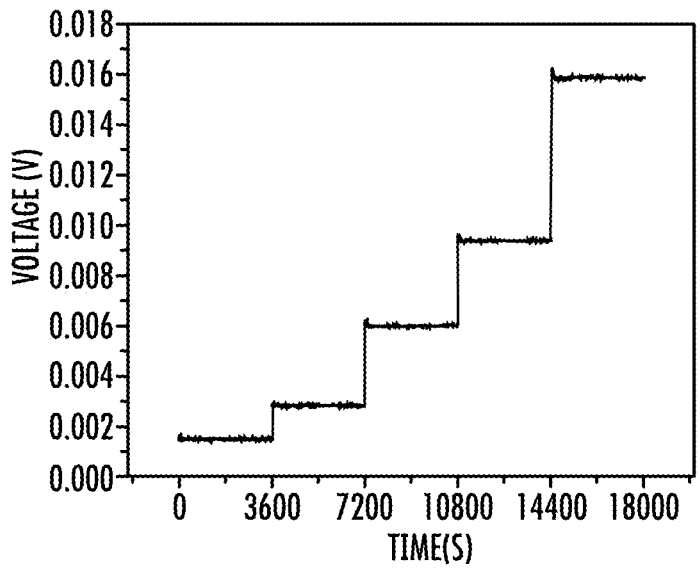
FIG. 12B is a chart illustrating voltage reading of a heat flux sensor of FIG. 12A over time when applying different power density (106.68, 201.79, 427.18, 667.38, 1127.72 W/m$^2$).
Figure 12C:
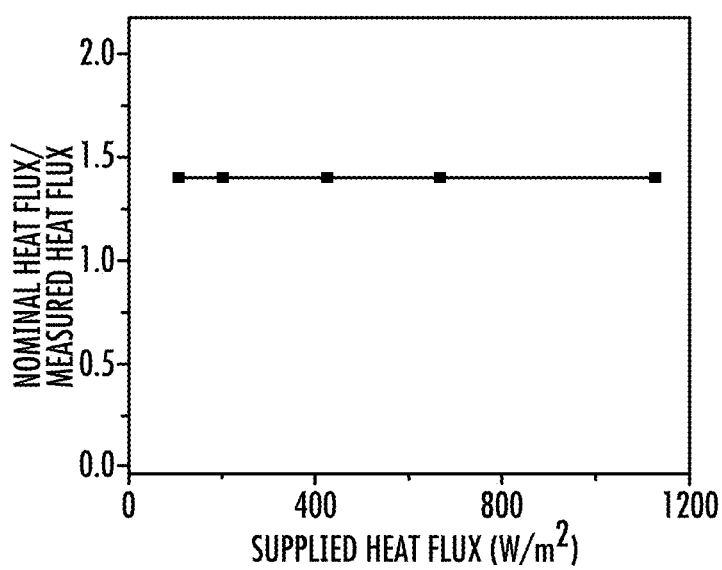
FIG. 12C is a chart illustrating the ratio of nominal heat flux to measured heat flux over the supplied heat flux using the system of FIG. 12A.

Calibration of the testing apparatus was performed every time before measurement. As shown in FIG. 12A, a heater was put on the top surface of copper plate which is covered by a layer of polyurethane foam of 3 cm thick to avoid heat loss. The other part is the same with testing system. FIG. 12B shows the voltage reading of the heat flux sensor when different heating power is supplied. The system quickly reaches steady state after <100 s. As shown in FIG. 12C, due to the difference in thermal resistance between the heat flux sensor and the glass slide, the nominal heat flux is 1.40 times larger than that measured by the heat flux sensor, which is independent of the applied power. In other words, heat transfer pathway from the top copper plate through the heat flux sensor to the bottom Peltier device is more resistive than that pathway through glass slides per unit area. This ratio is steady-state and is independent of applied heating power, and it is used as the rescaling factor for outdoor measurement for both radiative cooling and solar heating.

The following Examples are provided by way of illustration and not by way of limitation.

EXAMPLES

Supplemental Example Embodiment and Notes

Supplementary Note 1. Reliability Issues

1. Analysis of the Potential Impact of Dirt

It is expected that the interfacial thermal resistance can be impacted when dirt gets into the interface between the PI film and the substrate. When manufacturing the proposed dual-mode heating and cooling device, it is critical to package the film, the underneath substrate, and the rolling components into a tightly sealed modular system to highly reduce the dirt penetration risk. In addition, operation maintenance architectures such as brush cleaners installed at the separation edge of the heating/cooling film will intermittently clean the surface of the underneath substrate and help remove dirt that may appear between PI film and substrate.

2. Analysis of the Potential Impact of Humidity

Figure 13:
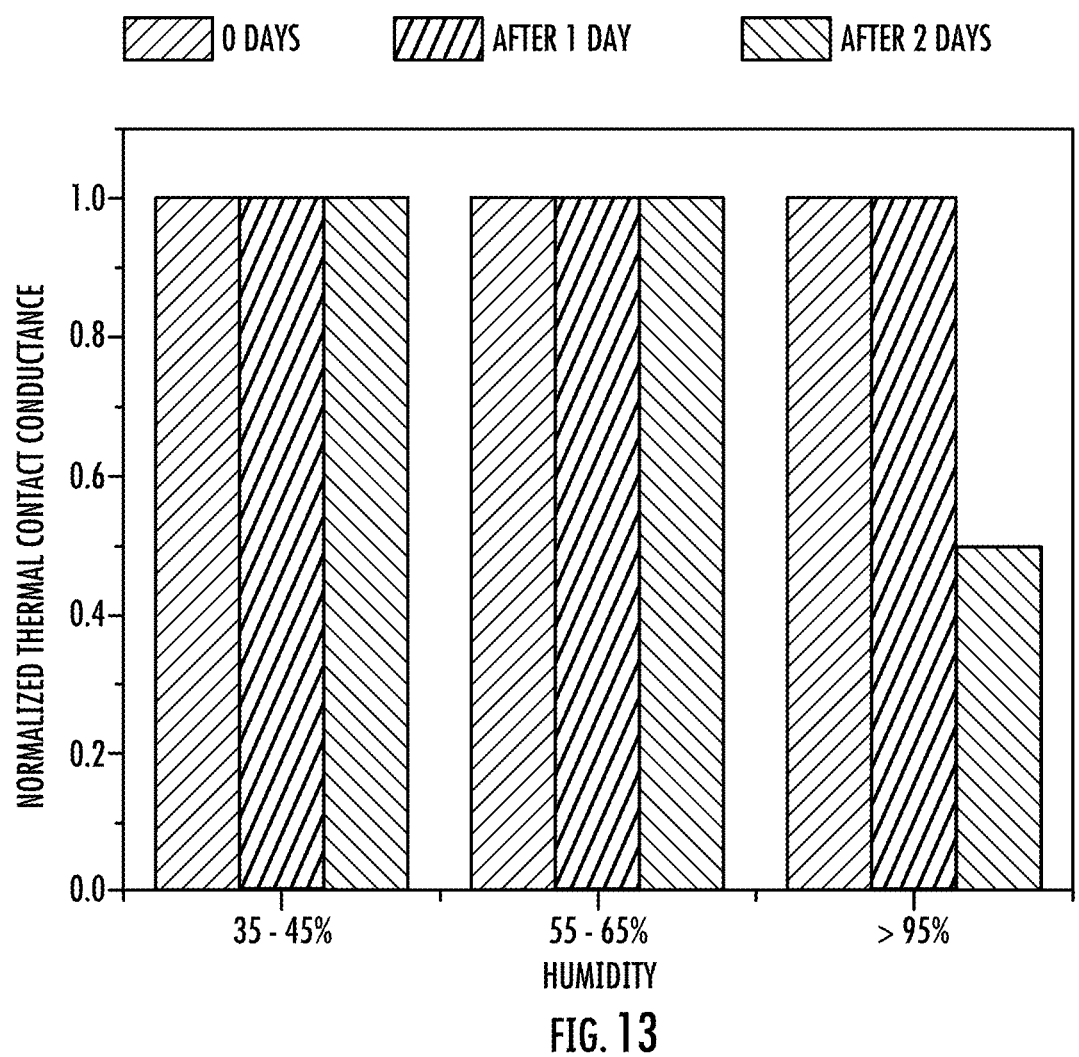
FIG. 13 is a chart illustrating thermal contact over time at different humidity levels.

As shown FIG. 13, the effect of humidity on interfacial thermal resistance is also demonstrated. The result shows that the good thermal contact can maintain for two days when the relative humidity is in the range of 40% to 60%. Even in the rare case of >95% humidity, a good thermal contact still can last for more than one day. In practical applications, periodic "charging" will be performed to ensure continuous good thermal contact.

Supplementary Note 2. Heating Material

Figure 14B:
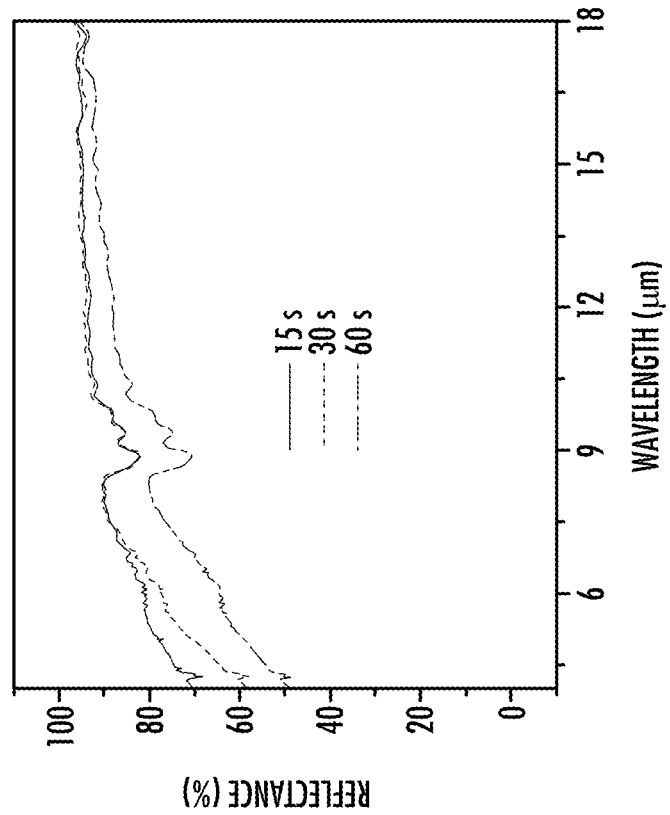
FIGS. 14A and 14B are charts illustrating reflectance spectra of heating materials of different reaction time with $CuSO_4$.
Figure 14A:
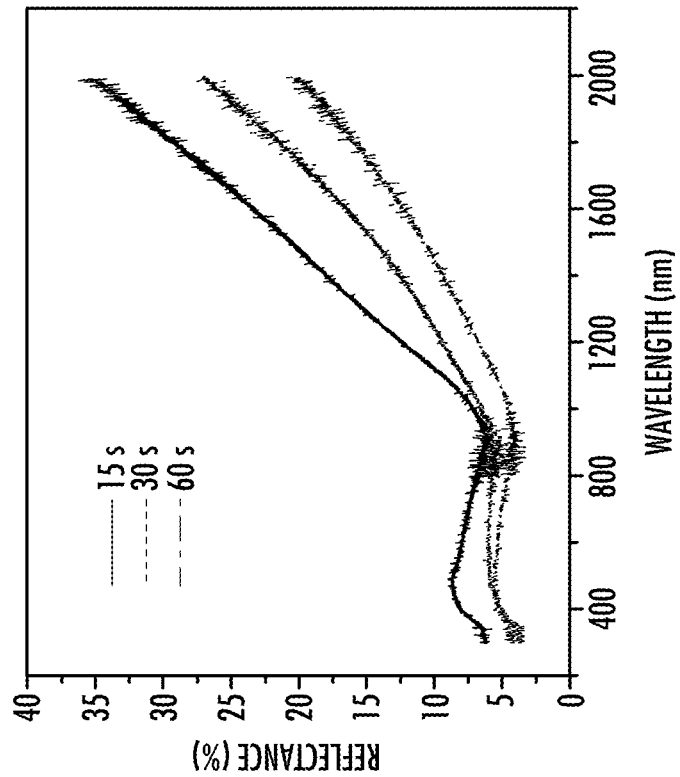
Figure 15A:
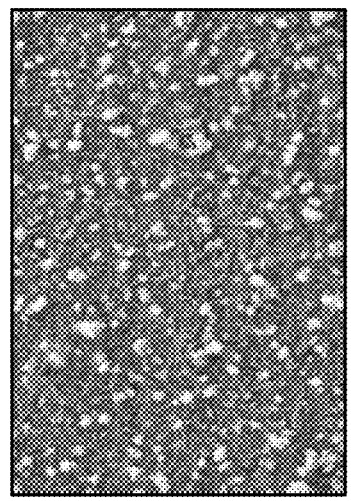
FIGS. 15A and 15B are SEM and Cu element mapping images of the heating materials with a reaction time of 15 seconds.
Figure 15B:
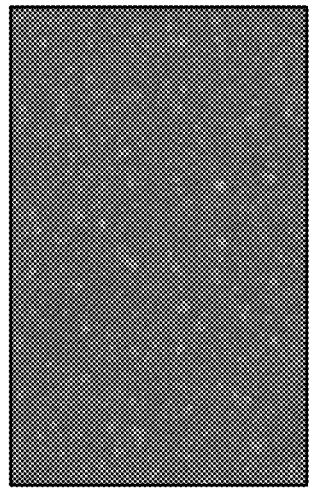
Figure 15C:
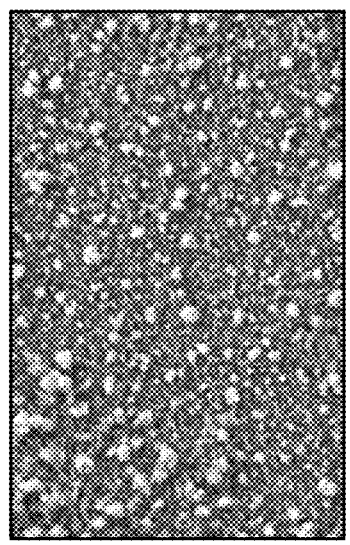
FIGS. 15C and 15D are SEM and Cu element mapping images of the heating materials with a reaction time of 30 seconds.
Figure 15D:
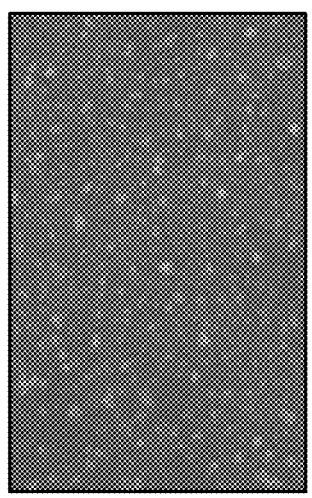
Figure 15E:
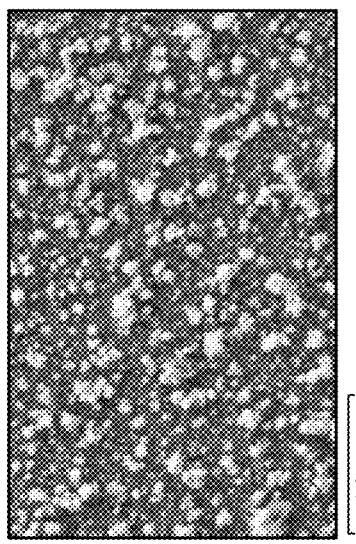
FIGS. 15E and 15F are SEM and Cu element mapping images of the heating materials with a reaction time of 60 seconds.
Figure 15F:
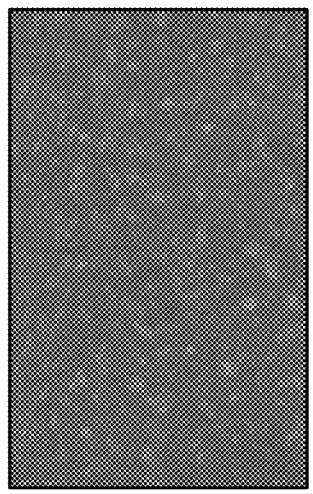

For heating material, on the copper film, a layer of zinc film of 1 µm thick was electrodeposited (voltage: 2 V, anode: zinc metal, electrolyte: 0.25 M $ZnSO_{4(aq)}$), followed by galvanic replacement reaction with 0.12 mM $CuSO_{4(aq)}$, and the heating material was obtained after deionized water washing and drying. As shown in FIG. 14, it can be found with the increase of reaction time with $CuSO_{4(aq)}$, the absorption of both 300-2000 nm and 4-18 µm increased. The observations can be attributed to the size of copper/copper oxide clusters is increased (as shown in FIG. 15). Specifically, the absorption of 300-2000 nm stems from the localized surface plasmon resonances of the Cu nanoparticles. The wide size distribution of the Cu nanoparticle clusters results in broadband absorption, which is beneficial for solar heating. As the reaction time increases, both near-field coupling and the total volume of light-matter interactions increase, which promotes broadband absorption in the solar spectrum. For 4-18 µm part, the nanoparticle layer behaves as a lossy effective medium because of the small cluster size compared to thermal radiation wavelength. Therefore, longer reaction time leads to a higher attenuation of light in both solar and mid-IR regimes.

Supplementary Note 3. Numerical Models for Radiative Cooling and Solar Heating

Material Cooling Power:

Planck's law describes the spectral radiance of a black body for wavelength ($\lambda$) at absolute temperature T is given by:

$$I_{BB}(T, \lambda) = \frac{2hc^2}{\lambda^5} \frac{1}{e^{\frac{hc}{\lambda kT}} - 1} \quad (1)$$

where c is the speed of light, h is Plank constant and k is the Boltzmann constant. The radiative cooling power density of surface film can be obtained by integrating the spectral radiance density over atmosphere long-wave infrared radiation transmission windows (LWIR), 7-13 um:

$$P_{rad}(T) = 2\pi \int_0^{\pi/2} \int_{7\,um}^{13\,um} I_{BB}(T,\lambda) \epsilon_{film}(\lambda,\theta) \sin\theta \cos\theta \, d\lambda \, d\theta \quad (2)$$

$\epsilon_{film}(\lambda,\theta)$ is the spectral emissivity (absorptivity) of the dual-mode surface film. Specifically, $\epsilon_{film}=0.941$ for cooling mode and $\epsilon_{film}=0.142$ for heating mode and are assumed to be angle-independent. Correspondingly, the power density of absorbed thermal radiation from the atmosphere is given by:

$$P_{amb}(T_{amb}) = 2\pi \int_0^{\pi/2} \int_{7\,um}^{13\,um} I_{BB}(T,\lambda) \epsilon_{film}(\lambda,\theta) \epsilon_{atm}(\lambda,\theta,H_2O) \sin\theta \cos\theta d\lambda d\theta \quad (3)$$

where, $T_{amb}$ is the ambient temperature and $\epsilon_{atm}(\lambda,\theta,H_2O)$ is the atmospheric emissivity. The atmospheric emissivity $\epsilon_{atm}(\lambda,\theta,H_2O)$ at LWIR (7-13 um) was calculated using ATRAN—a web-based software provided by SOFIA Science Center. The cooling power density (W/m²), $p_{cool}$, after taking the solar heat gain and the convective/conductive loss into consideration, is given:

$$p_{cool} = p_{rad} - p_{amb} - h_L \Delta T - I\beta \quad (4)$$

where $h_L$ is heat transfer coefficient of convective and conductive loss, $\Delta T$ is the temperature difference between cooling material surface and environment. I is the global horizontal solar radiation. $\beta$ is sunlight absorption coefficient of cooling film. The model value of FIG. 4 is calculated by this method.

System Cooling-Mode Energy Saving:

Potentially, there are quite many application methods for the proposed dual-mode radiation heating and radiative cooling materials in buildings. An example application of integrating the material with building envelopes to provide space heating and cooling energy using heat exchangers is demonstrated. At this system level application, a comprehensive integrated analysis of the proposed device and the subject building is needed, which creates hourly performance simulation for the 16 cities throughout a whole year. In addition, in order to evaluate the energy savings of the dual-mode device under real application condition, the typical meteorological year (TMY3) weather data are used, and the impacts of the humidity and the clouds on cooling capability are evaluated. Therefore, the following calculation algorithms (eq.5-eq.10) are selected to estimate the cooling power with effective atmospheric emissivity ($\epsilon_{atm}$):

$$P_{cooling\,power} = P'_{rad} - P'_{atm} \quad (5)$$

$$P'_{rad} = A\epsilon_{film}\sigma T_{film}^4 \quad (6)$$

$$P'_{atm} = A\epsilon_{film}\epsilon_{atm}\sigma T_{amb}^4 \quad (7)$$

where $\epsilon_{film}$ and $T_{film}$ are the emissivity and surface temperature of the film, and A is the area.

The $\epsilon_{atm}$ is given by, $$\epsilon_{atm} = \epsilon_{atm,c}(1-0.78CF) + 0.38CF^{0.95}RH^{0.17} \quad (8)$$

$$\epsilon_{atm,c} = 0.618 + 0.056\sqrt{P_w} \quad (9)$$

$$P_w = P_0 \exp[(c_7 T_d)/(T_d + T_0)] \quad (10)$$

Where $\epsilon_{atm,c}$ is the effective sky emissivity under clear skies, CF is the cloud fraction, RH is the ambient relative humidity, and $P_w$ is the ambient water vapor partial pressure, $T_d$ is the dew point, $P_0 = 610.94$ Pa, $c_7 = 17.625$, and $T_0 = 243.04°$ C. The hourly values of these weather-related parameters can be obtained from TMY3 weather data.

With heat transfer medium such as water flowing in the heat/cold exchangers or collectors, the cold water will possess varied temperatures with environmental weather changes. As Ref 6 shown, lower temperature water can be directly used for space cooling through indoor systems such as radiant cooling ceilings, which commonly adopts a fluid temperature of 13-18° C. in order to avoid surface condensation. In contrast, when the water temperature is higher than this range, the radiative cooling cold water can be supplied to air conditioner side and cool the condenser side to achieve higher efficiency (details seen in the next section). In other words, the cooling power is to directly cool the building spaces when the temperature is below 18° C., and to cool the air conditioner condenser when the temperature is above 18° C. Therefore, when the temperature is below 18° C., that particular hour's $P_{cooling\,saving}$ is calculated by, $$P_{cooling\,saving} = \text{MIN}(P_{cooling}, P_{cooling\,load}) \quad (11)$$

System Cooling Power Analysis for Air-Conditioner Unit

Figure 16B:
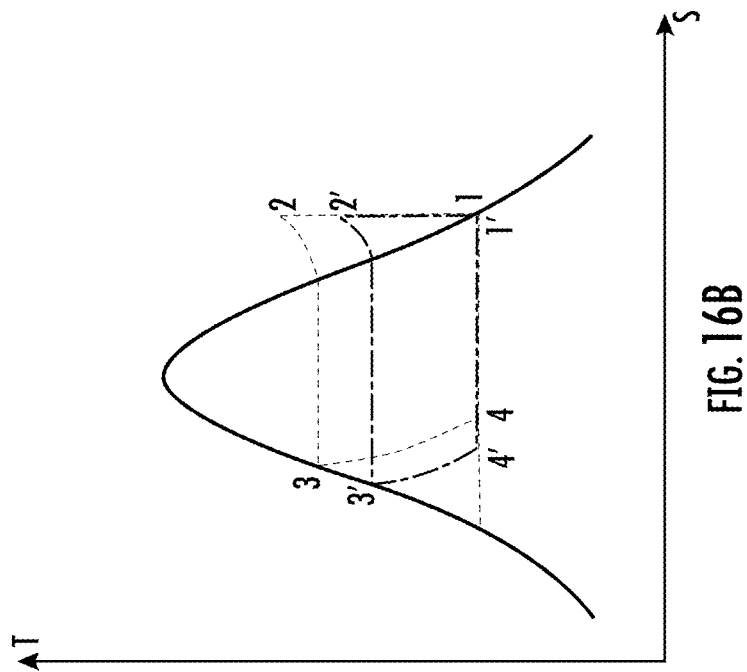
FIG. 16B is a thermodynamic cycle diagram of the air-cooled AC with and without radiative cooling.
Figure 16A:
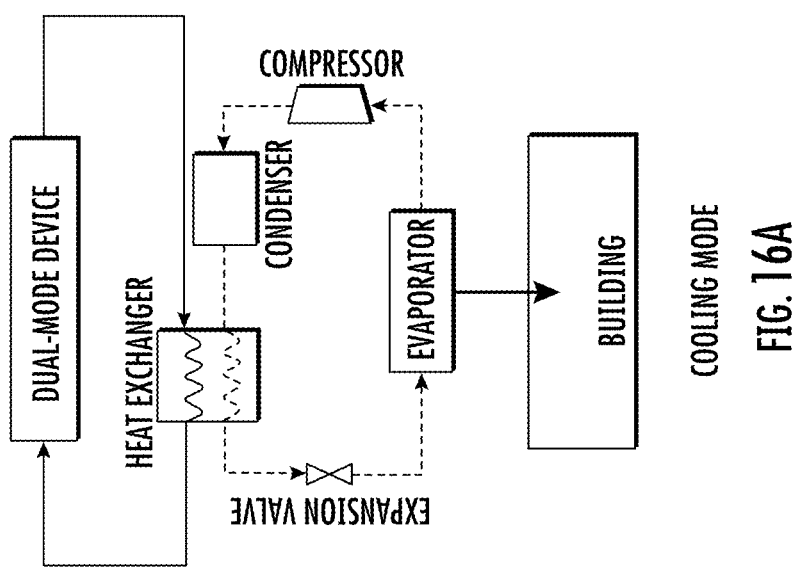
FIG. 16A is a schematic for an air-cooled air conditioning (AC) system coupled with radiative-cooling fluid panels.

The energy saving is modeled by considering the case of retrofitting a traditional air-cooled vapor-compression air-conditioner unit with the radiative cooling device using water as the heat transfer fluid, as shown in FIG. 16A. The thermodynamic cycles are shown in FIG. 16B. The blue line represents the traditional air-cooled AC and the red line represents the AC coupled with radiatively-cooled, below-ambient-temperature water. Points 1-4 represent saturated vapor at low pressure, compressed vapor, saturated liquid at high pressure, liquid after expansion valve. The radiative cooling system provides additional cooling and reduces the condenser temperature, and the new thermodynamic cycle follows points 1'-4', which is more efficient than 1-4. By comparing the coefficient of performance (COP) before and after installing the radiative cooler, the energy saving can be calculated.

For the air-cooled vapor-compression AC, the basic thermodynamic equations (eq.12-eq.17) are listed below to demonstrate its performance during the "compression-condensation-expansion-evaporation" loop. $P_{load}$ is the heat removed from the building for maintaining the comfortable room temperature (22° C.) per unit time, which is calculated from EnergyPlus. dm/dt is the mass flow rate of refrigerant. $h_1$, $h_2$, $h_3$, $h_4$ are the enthalpies for 4 points in the thermodynamic cycle. $P_r$ is the condenser heat rejection per unit time, which is also equal to the cooling power of the fan for the condenser (eq.14). $h_a(v_{air})$ is the overall heat transfer coefficient of a finned tube heat exchanger, which is the function of air velocity. The formula of $h_a$ is based on the empirical correlation of the Nusselt number of laminar flow on flat plates and the geometrical parameters of a common finned tube heat exchanger. $T_{airin}$ and $T_{airout}$ are the temperature for air flowing in and out of the condenser fins, respectively. $P_{com}$ is the input power for the compressor. $\eta_{com}$ is the compressor efficiency. $P_{fan}(v_{air})$ is the power consumption of the fan calculated by the fan affinity law. Hence, the COP of the traditional AC can be calculated by dividing $P_{load}$ with $P_{total}$.

$$P_{load} = \frac{dm}{dt}(h_1 - h_4) \quad (12)$$

$$P_r = \frac{dm}{dt}(h_2 - h_3) \quad (13)$$

$$P_r = h_a(v_{air}) \cdot (T_{airout} - T_{airin}) \quad (14)$$

$$P_{com} = \frac{dm}{dt}(h_2 - h_1)/\eta_{com} \quad (15)$$

$$P_{total} = P_{fan}(v_{air}) + P_{com} \quad (16)$$

$$COP = \frac{P_{load}}{P_{total}} \quad (17)$$

Then radiatively-cooled water panel was added to the system to enhance the efficiency. For the cooling panels, thermodynamic equations (eq.18-eq.22) were given below. Note $p_{cool}$ is cooling power density (W/m²) and $P_{cool}$ is the cooling power (W). To account for the negative correlation between cooling power density and sub-ambient temperature drop ($\Delta T_{cool}$) due to the hemispherical ambient thermal radiance, the cooling power density is subtracted by 4.23*$\Delta T_{cool}$, which is based on Eriksson, T. S., and C. G. Granqvist's research. S is the effective roof area that can be utilized, which is assumed to be 60% of the model building rooftop area. $dm_{water}/dt$ is the water mass flow rate inside the tube. $C_{water}$ is the heat capacity of water. $h_w(v_{water})$ is the overall heat transfer coefficient of water approximated with the Dittus-Boelter equation for pipe flow. $T_{waterin}$ and $T_{waterout}$ are the temperature for water flowing in and out of the radiative cooling surface-plate heat exchanger, respectively. $P_{pump}(v_{water})$ is input water pump power, which is also calculated by the fan affinity law. The new COP can, therefore, be calculated by dividing $P_{load}$ by $P'_{total}$.

$$(p_{cool} - 4.23 \cdot \Delta T_{cool})S = P_{cool} = \frac{dm_{water}}{dt} C_{water} \Delta T_{cool} \quad (18)$$

$$P'_r = h_a(v_{air}) \cdot (T_{airout} - T_{airin}) + h_w(v_{water}) \cdot (T_{waterout} - T_{waterin}) \quad (19)$$

$$P'_{total} = P_{fan}(v_{air}) + P_{pump}(v_{water}) + P_{com}(\Delta t_{cool}) \quad (20)$$

$$COP_{new} = \frac{P_{load}}{P'_{total}} \quad (21)$$

Finally, the cooling energy saved by using cooling materials can be demonstrated by:

$$E_{saving,cool} = E\left(1 - \frac{COP}{COP_{new}}\right) \quad (22)$$

where E is the cooling electricity consumption with traditional AC, calculated by EnergyPlus Heating-Mode Energy Saving:

For heating energy saving, eq.23 and 24 were used to analyze the device performance. $P_{heating}$ is the radiative heating power of the device. I is the global horizontal solar radiation obtained from TMY3 weather data. S is the effective roof area that can be utilized, which is assumed to be 60% of the model building rooftop area. $\alpha$ is absorption coefficient of heating materials. $E_{saving,heat}$ is the heating energy saving.

$$P_{heating} = IS\alpha \quad (23)$$

$$E_{saving,heat} = 3600 * MIN(P_{heating}, P_{heating\,load}) \quad (24)$$

Through the above cooling model and heating model, the cooling and heating energy saving of each city per hour can be calculated. In dual-mode calculation, it can be chosen to operate in the mode that generates the maximum energy saving in that specific hour. That is, if the cooling saving is larger than heating saving, then cooling mode is used in this hour. Otherwise, heating mode would be taken into consideration.

$$E_{saving,dual} = MAX(E_{saving,cool}, E_{saving,heat}) \quad (25)$$

Therefore, by arranging all cooling and heating energy saving in each hour of each city, the annual energy saving in the U.S. can be determined in heating-only, cooling-only, and dual-mode approaches (see FIG. 6).

One skilled in the art will readily appreciate that the present disclosure is well adapted to carry out the objects and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

The foregoing is illustrative of the present invention and is not to be construed as limiting thereof. Although a few example embodiments of this invention have been described, those skilled in the art will readily appreciate that many modifications are possible in the example embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. A dual-mode heating and cooling system comprising:
a dual-mode heating and cooling device comprising a cooling part and a heating part that are configured to be selectively exposed to sunlight in a cooling mode and a heating mode, respectively, the cooling part configured to provide radiative cooling to a structure, the heating part configured to provide solar heating to the structure,
wherein the device comprises a film with the cooling part and the heating part side-by-side on the film.

2. The system of claim 1 wherein the device comprises a first roller and a second roller with the film coupled to the first roller and the second roller, and wherein the first roller and the second roller are configured to be rotated in a first direction to expose the cooling part to the sunlight and in a second direction to expose the heating part to the sunlight.

3. The system of claim 2 wherein the heating part is at least partially wound around the first roller when the cooling part is exposed to the sunlight, and wherein the cooling part is at least partially wound around the second roller when the heating part is exposed to the sunlight.

4. The system of claim 2 wherein the device comprises a housing surrounding the film and the first roller and the second roller.

5. The system of claim 2 further comprising a first cleaning mechanism adjacent the first roller and a second cleaning mechanism adjacent the second roller, wherein the first cleaning mechanism and the second cleaning mechanism are configured to remove debris from the film.

6. The system of claim 1 wherein the film comprises a substrate, wherein the cooling part comprises a solar-reflecting layer on the substrate and an infrared-emitting layer on the solar-reflecting layer, and wherein the heating part comprises a metallic layer comprising metal and/or metallic nanoparticles on the substrate.

7. The system of claim 6 wherein the substrate comprises polyimide, wherein the solar-reflecting layer of the cooling part comprises silver, wherein the infrared-emitting layer comprises polydimethylsiloxane, and/or wherein the metallic layer of the heating part comprises copper and zinc.

8. The system of claim 6 wherein the infrared-emitting layer of the cooling part has substantial infrared absorption in wavelengths of 7 to 20 microns.

9. The system of claim 1 further comprising a voltage source configured to supply a voltage to the film to reduce the thermal contact resistance between the film and the structure.

10. The system of claim 9 wherein the voltage source is configured to supply a voltage of about 2 kV to the film.

11. The system of claim 1 further comprising a temperature sensor and a controller, wherein the controller is configured to direct the system to expose the cooling part to the sunlight when the temperature is above a predetermined temperature and to expose the heating part to the sunlight when the temperature is below the predetermined temperature.

12. The system of claim 1 wherein the structure comprises a roof, a wall, and/or a heat exchanger.

13. A method for dual-mode heating and cooling of a structure, the method comprising:
providing a dual-mode heating and cooling device comprising a cooling part and a heating part that are configured to be selectively exposed to sunlight in a cooling mode and a heating mode, respectively, the cooling part configured to provide radiative cooling to a structure, the heating part configured to provide solar heating to the structure, wherein the device comprises a film with the cooling part and the heating part side-by-side on the film;
cooling a structure to which the device is coupled in the cooling mode;
heating the structure in the heating mode; and
automatically switching between the cooling and heating steps multiple times in response to a measured outside temperature.

14. The method of claim 13 wherein the device comprises first and second rollers, the method comprising rotating the rollers in a first direction to expose the cooling part and rotating the rollers in a second, opposite direction to expose the heating part.

15. The method of claim 13 further comprising applying voltage to the film to reduce the thermal contact resistance between the film and the structure.

16. The method of claim 15 further comprising removing the voltage from the film while maintaining a static charge between the film and the structure.

* * * * *